(12) United States Patent
Reinshagen et al.

(10) Patent No.: US 11,801,668 B2
(45) Date of Patent: Oct. 31, 2023

(54) MULTILAYER OXIDE CERAMIC BODY WITH ALIGNED SINTERING BEHAVIOUR

(71) Applicant: Ivoclar Vivadent AG, Schaan (LI)

(72) Inventors: Jörg Reinshagen, Pforzheim (DE); Henning Meyhöfer, Stuttgart (DE)

(73) Assignee: Ivoclar Vivadent AG, Schaan (LI)

( * ) Notice: Subject to any disclaimer, the term of this patent is extended or adjusted under 35 U.S.C. 154(b) by 198 days.

(21) Appl. No.: 16/470,813

(22) PCT Filed: Dec. 23, 2017

(86) PCT No.: PCT/EP2017/084571
§ 371 (c)(1),
(2) Date: Jun. 18, 2019

(87) PCT Pub. No.: WO2018/115529
PCT Pub. Date: Jun. 28, 2018

(65) Prior Publication Data
US 2019/0381769 A1 Dec. 19, 2019

(30) Foreign Application Priority Data
Dec. 23, 2016 (EP) ..................................... 16206751

(51) Int. Cl.
*B32B 18/00* (2006.01)
*A61C 13/00* (2006.01)
(Continued)

(52) U.S. Cl.
CPC .......... *B32B 18/00* (2013.01); *A61C 13/0022* (2013.01); *C04B 35/48* (2013.01);
(Continued)

(58) Field of Classification Search
CPC ..... B32B 18/00; A61C 13/0022; C04B 35/48; C04B 2235/3206; C04B 2235/3217;
(Continued)

(56) References Cited

U.S. PATENT DOCUMENTS 5,011,403 A 4/1991 Sadoun et al.
5,263,858 A 11/1993 Yoshida et al.
(Continued)

FOREIGN PATENT DOCUMENTS

CA 2252660 A1 5/1999
CN 104774007 A 7/2015
(Continued)

OTHER PUBLICATIONS

Merriam Webster.com definition; base; https://www.merriam-webster.com/dictionary/based%20on; Apr. 7, 2022 (Year: 2022).*
(Continued)

*Primary Examiner* — Humera N. Sheikh
*Assistant Examiner* — Elizabeth D Ivey
(74) *Attorney, Agent, or Firm* — Ann M. Knab; Thad McMurray

(57) ABSTRACT

The invention relates to multilayer oxide ceramic bodies and in particular presintered multilayer oxide ceramic blanks and oxide ceramic green bodies, which comprise at least two different layers and are suitable for dental applications, wherein at least one layer contains $La_2O_3$ and the at least two different layers differ in their content of $La_2O_3$. These bodies can be thermally densified by further sintering without distortion and are therefore particularly suitable for the production of dental restorations. The invention also relates to a process for the production of such multilayer oxide ceramic bodies as well as a process for the production of dental restorations using the multilayer oxide ceramic bodies.

28 Claims, 13 Drawing Sheets

(51) Int. Cl.
*C04B 35/48* (2006.01)
*C04B 35/645* (2006.01)

(52) U.S. Cl.
CPC .... *C04B 35/645* (2013.01); *C04B 2235/3206* (2013.01); *C04B 2235/3217* (2013.01); *C04B 2235/3224* (2013.01); *C04B 2235/3225* (2013.01); *C04B 2235/3227* (2013.01); *C04B 2235/3241* (2013.01); *C04B 2235/3246* (2013.01); *C04B 2235/3265* (2013.01); *C04B 2235/3272* (2013.01); *C04B 2235/612* (2013.01); *C04B 2235/661* (2013.01); *C04B 2235/75* (2013.01)

(58) Field of Classification Search
CPC .... C04B 2235/3224; C04B 2235/3225; C04B 2235/3227; C04B 2235/3246; C04B 2235/75
See application file for complete search history.

(56) References Cited

U.S. PATENT DOCUMENTS

| | | | |
|---|---|---|---|
| 5,656,564 | A | 8/1997 | Nakayama et al. |
| 6,379,593 | B1 | 4/2002 | Datzmann et al. |
| 6,709,694 | B1 | 3/2004 | Suttor et al. |
| 6,713,421 | B1 | 3/2004 | Hauptmann et al. |
| 8,940,402 | B2 | 1/2015 | Giordano |
| 9,321,674 | B2 | 4/2016 | Ritzberger et al. |
| 10,064,708 | B2 | 9/2018 | Burke et al. |
| 2006/0025866 | A1* | 2/2006 | Serafin, Jr. ............... B28B 3/003 623/23.56 |
| 2006/0117989 | A1 | 6/2006 | Hauptmann et al. |
| 2007/0272120 | A1 | 11/2007 | Engels et al. |
| 2007/0292597 | A1 | 12/2007 | Ritzberger et al. |
| 2008/0064011 | A1 | 3/2008 | Rheinberger et al. |
| 2008/0274440 | A1 | 11/2008 | Smith et al. |
| 2009/0246735 | A1 | 10/2009 | Rogowski et al. |
| 2010/0216095 | A1 | 8/2010 | Schard |
| 2011/0189636 | A1 | 8/2011 | Thiel et al. |
| 2012/0139141 | A1 | 6/2012 | Khan et al. |
| 2013/0338251 | A1* | 12/2013 | Joly ....................... C07C 323/52 522/181 |
| 2014/0135200 | A1 | 5/2014 | Reinshagen et al. |
| 2015/0238291 | A1* | 8/2015 | Hauptmann ....... A61C 13/0006 428/64.1 |
| 2015/0282905 | A1* | 10/2015 | Jahns ................ C04B 35/63488 433/167 |
| 2016/0157971 | A1* | 6/2016 | Rothbrust ............ C04B 35/486 428/217 |
| 2017/0020639 | A1* | 1/2017 | Jahns ....................... A61C 7/00 |

FOREIGN PATENT DOCUMENTS

| | | |
|---|---|---|
| DE | 1538759 A1 | 1/1970 |
| DE | 10313078 A1 | 10/2004 |

OTHER PUBLICATIONS

International Preliminary Report on Patentability of PCT/EP2017/084571, dated Jun. 25, 2019, 9 pages.
Miura M. et al., "Formation of plate-like lanthanum-ß-Aluminate crystal in Ce-TZP matrix," Journal of Materials Science 29 (1994) Jan. 1, No. 1, pp. 262-268, London GB.
Chen, H. et al., "Dynamic Characteristics of Functionally Gradient Piezoelectric Actuators," Properties and Applications of Dielectric Materials 2000, Bd. 2, 983-987.
Denry, I. et al., "State of the art of zirconia for dental applications," Dental Materials, 24, 2008, pp. 299-307.
Hannink R., et al., "Transformation Toughening in Zirconia-Containing Ceramics," J. Am. Ceram. Soc., 83 [3] 461-87 (2000).
Jin D et al., "Functionally Graded Piezoelectric Ceramics for Ultrasonic Transducers," Key Engineering Materials, cols. 336-338, pp. 2609-2612. 2007.
Merriam Webster.com definition; chief; https://www.merriam-webster.com/dictionary/chief; Jul. 20, 2022 (Year:2022).
Merriam Webster.com definition; main; https://www.merriam-webster.com/dictionary/main; Jul. 20, 2022 (Year:2022).
Merriam Webster.com definition; principal; https://www.merriam-webster.com/dictionary/principal; Jul. 20, 2022 (Year:2022).

* cited by examiner

A

B

A

B

A

B

A

B

A

B

A

B

MULTILAYER OXIDE CERAMIC BODY WITH ALIGNED SINTERING BEHAVIOUR

CROSS-REFERENCE TO RELATED APPLICATIONS

This application is a National Stage application of International patent application PCT/EP2017/084571 filed on Dec. 23, 2017, which claims priority to European patent application No. 16206751.6 filed on Dec. 23, 2016, the disclosures of which are incorporated herein by reference in their entirety.

FIELD OF THE INVENTION

The invention relates to multilayer oxide ceramic bodies and in particular presintered multilayer oxide ceramic blanks and oxide ceramic green bodies which are suitable for dental applications. These bodies can be thermally densified by further sintering without distortion and are therefore particularly suitable for the production of dental restorations having excellent mechanical properties and very high accuracy of fit, and make it possible to imitate the optical properties of natural teeth very precisely. The invention also relates to a process for the production of such multilayer oxide ceramic bodies as well as a process for the production of dental restorations using the multilayer oxide ceramic bodies.

BACKGROUND OF THE INVENTION

For many years oxide ceramic materials have been used for the production of dental implants and restorations. Such ceramics are typically based on zirconia in the form of tetragonal zirconia polycrystal (TZP). Pure $ZrO_2$ undergoes a tetragonal-to-monoclinic phase transformation at temperatures below 950° C. which is accompanied by a considerable increase in volume. Maintaining zirconia in its tetragonal form at room temperature requires the use of additives such as $Y_2O_3$, $CeO_2$, MgO or CaO. These additives inhibit the tetragonal-to-monoclinic transformation, thereby resulting in a metastable state in which zirconia is completely or partially in its tetragonal form. When cracks form in such metastable tetragonal zirconia ceramics, the stress at the crack tip triggers a local transformation from the tetragonal to the monoclinic form, and the increase in volume associated therewith effectively opposes crack propagation. This so-called transformation-toughening mechanism provides for high toughness of stabilized zirconia ceramics (Hannink et al., J. Am. Ceram. Soc. 2000, 83, 461-487). This, together with the bio-inert properties of zirconia, has led to the use of doped TZP in orthopaedics and for dental restorations. Today, in particular tetragonal zirconia polycrystal stabilized with $Y_2O_3$(Y-TZP), usually with addition of $Al_2O_3$ (about 0.25 wt.-%), are widely used as an all-ceramic dental biomaterial (Denry et al., Dental Materials 2008, 24, 299-307).

Various processes are known for the preparation of ceramics. Preferred processes are (i) axial pressing or cold isostatic pressing (CIP) followed by conventional sintering, (ii) slip casting followed by conventional sintering, and (iii) hot pressing (HP) or hot isostatic pressing (HIP).

For dental applications, the preparation of ceramic materials often comprises two densification steps separated by a shaping step. Accordingly, the ceramic materials can be pressed or cast and then presintered to an intermediate open-pored state. Then, a shaping or preshaping of the ceramic material can be carried out, followed by a final thermal densification by further sintering.

In order to improve the aesthetic appearance of dental restorations, ceramics for use as dental restorative materials often need to be provided with coloration. A range of possibilities are known for the coloration of ceramic materials.

One approach for obtaining coloured dental ceramic materials uses the coloration of a ceramic material in the porous state by infiltration of solutions of metal compounds. Usually, the porous structure is dried, fully or partially infiltrated with a colouring solution, the surface is cleaned and the infiltrated structure is dried, optionally the porous structure is infiltrated with a further colouring solution and finally sintered.

U.S. Pat. No. 6,709,694 B1 describes a process for the coloration of oxide ceramics in the porous or absorbent state with solutions of salts or complexes of transition metals.

EP 1 486 476 A1 describes a process for colouring presintered ceramic bodies using a solution which contains a metal salt, a solvent and a polyethylene glycol with an $M_n$ in the range of from 1,000 to 200,000.

This approach suffers from the complicated process for the dental technician and the low homogeneity of the obtained colour distribution. Furthermore, depending on the concentration of the colouring ions, the enlargement factor can change within the coloured layers, which leads to stresses between the coloured and non-coloured areas during the final sintering step.

Another approach involves the precolouring of a zirconia powder by coprecipitation of zirconia together with colouring compounds or by contacting a zirconia powder with solutions of colouring compounds to obtain precoloured primary and secondary particles with varying powder characteristics.

U.S. Pat. No. 5,011,403 A describes the production of a coloured bracket by compressing and sintering a powder obtained by adding colouring transition metal oxides to a partially stabilized zirconia powder, wherein the transition metal oxides are incorporated either in powder form or by atomizing the zirconia powder with a solution of water-soluble salts of the transition metal oxide.

U.S. Pat. No. 5,263,858 A describes the production of an ivory-coloured sintered zirconia body that can be used as a bracket for orthodontic applications, wherein a mixed powder is prepared by (A) coprecipitation of a solution containing compounds of zirconium, a stabilizer, erbium and praseodymium and calcination or (B) mixing solutions of compounds of erbium and praseodymium with a zirconia powder containing a stabilizer, and a shaped body is formed from the resulting powder and sintered.

U.S. Pat. No. 5,656,564 A describes coloured sintered zirconia bodies for orthodontic bracket materials which are produced by wet mixing a stabilized zirconia powder with colouring substances, shaping the obtained powder and sintering.

U.S. Pat. No. 6,713,421 A describes blanks based on a ceramic composition which contains zirconia, at least one of the oxides of aluminium, gallium, germanium and indium and in addition colouring additives. The ceramic composition is prepared by coprecipitation and calcination.

A further approach involves the coloration of ready-to-press ceramic powders by coating techniques.

US 2007/292597 A1 describes a process for the production of single- and multi-coloured blanks and dental shaped parts, in which an oxide powder is coated with a colouring substance, the coloured powder is compressed in order to form a shaped body and the compressed shaped body is sintered.

US 2008/0274440 A1 describes an abutment for a dental implant which comprises a one-piece supporting structure for a dental prosthesis which is produced from a ceramic material and is coloured to match the colour of the dental prosthesis to the surrounding tooth material and gingival tissue. The coloration of the abutment can be achieved inter alia by coating an oxide powder with colouring substances according to US 2007/292597 A1.

Yet another approach involves colouring by mixing together coloured and non-coloured powders and pigments. U.S. Pat. No. 6,379,593 describes a process for the production of a multi-coloured shaped body which is suitable for further processing to form a dental restoration, in which differently coloured ceramic materials are introduced successively into an extrusion die, compressed into the shape of a shaped body and sintered.

US 2007/272120 A1 describes a ceramic block which comprises first and second ceramic compounds with different optical properties and further a transition area between the ceramic compounds in which the variation gradient of the resulting optical properties is substantially constant.

US 2008/064011 A1 describes a multi-coloured shaped body with differently coloured main layers and intermediate layers, in which a change in colour between the intermediate layers takes place in a direction which is contrary to the direction of the change in colour between the main layers. Also disclosed is a multi-coloured shaped body with differently coloured main layers and an intermediate layer which contains a mixture of the materials of the main layers.

WO 2008/083358 A1 describes a multi-coloured dental blank with concentric inner and outer zones with different coloration.

US 2010/0216095 A1 describes the production of coloured dental ceramics in which Y-TZP is mixed with colouring components in order to obtain substantially homogeneous aggregate materials, differently coloured aggregate materials are mixed, pressed and sintered.

US 2011/0189636 A1 describes shaped bodies which contain differently coloured first and second components, wherein the second component is arranged within the first component to form a curved boundary surface.

US 2012/139141 A1 describes the production of coloured zirconia products by treating a Y-TZP powder with a solution of colouring agents in order to obtain a pigmented powder, mixing the pigmented powder with an uncoloured powder, compressing the mixed powder and sintering it.

It has been shown that the processes according to the state of the art suffer from the problem of differing and incompatible sintering kinetics of the different ceramic powders used therein, such as combinations of coloured and uncoloured powders or combinations of differently coloured powders. When different powders are combined in order to form the different layers of a multilayer ceramic body, these differences in sintering kinetics result in a distortion of the body upon sintering. Such a distortion is unsuitable in particular in the case of dental applications.

WO 2015/011079 A1 describes multilayer oxide ceramic blanks for the production of dental restorations and processes for the production thereof, in which the sintering behaviour of the different layers is aligned. However, it has been shown that the colour and, in particular, the translucent properties of the oxide ceramics are not optimally suited to imitating the properties of natural teeth in all cases.

SUMMARY OF THE INVENTION

The object of the invention is, therefore, to provide multilayer oxide ceramic bodies and, in particular, oxide ceramic blanks with differently coloured layers, which show no distortion during the thermal densification and, in particular, to provide ceramic bodies which are suitable for the production of dental products with high accuracy of fit, reliable and easy processing by the dental technician and a very good aesthetic appearance of the finally densified ceramic.

This object is achieved by the presintered multilayer oxide ceramic blank according to the claims. A subject-matter of the invention is also the multilayer oxide ceramic green body according to the claims, the process for the production of a blank or green body according to the claims and the multilayer oxide ceramic blank or green body according to the claims obtainable according to this process, as well as the process for the production of a dental restoration according to the claim.

BRIEF DESCRIPTION OF THE DRAWINGS

Further advantages, details and features result from the subsequent description of several exemplary embodiments of the invention with the help of the drawings, wherein.

DETAILED DESCRIPTION

Figure 1:
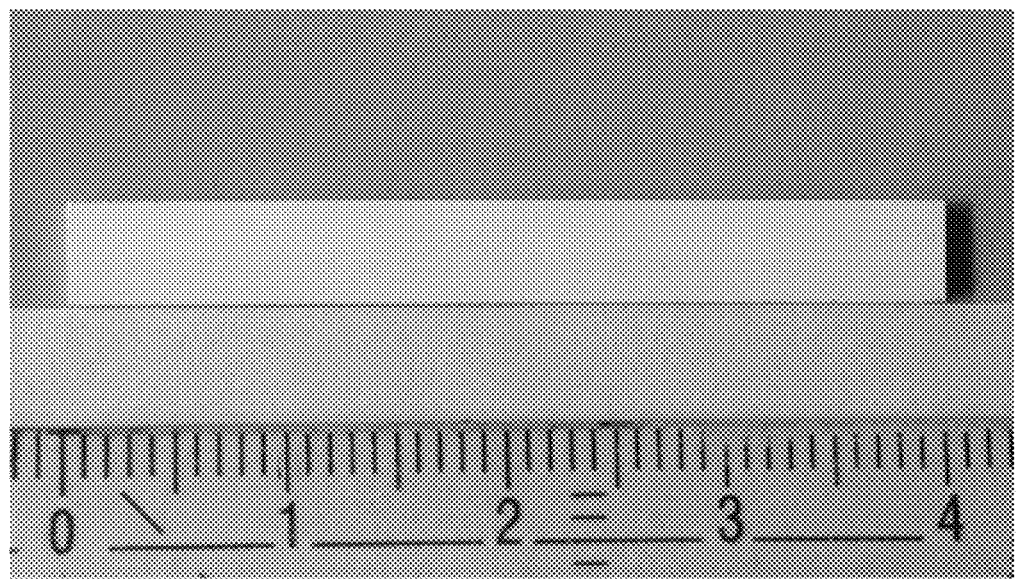
FIG. 1A shows an overview of a presintered blank positioned against a ruler or paper edge to measure bending.
FIG. 1B shows a detailed view of a presintered blank positioned against a ruler or paper edge to measure bending.
Figure 1:
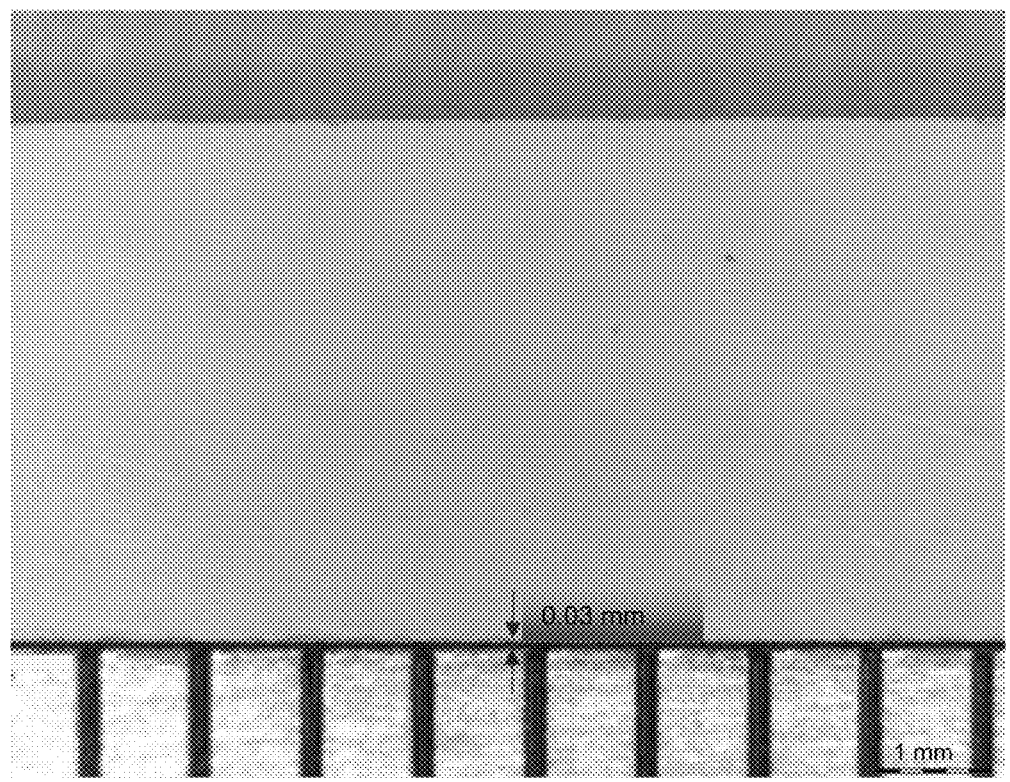

The presintered multilayer oxide ceramic blank according to the invention is characterized in that it comprises at least two different layers, wherein at least one layer contains $La_2O_3$ and the at least two different layers differ in their content of $La_2O_3$.

It has surprisingly been shown that the blanks according to the invention show no or essentially no distortion during the presintering or during the final sintering. In particular, they do not suffer from significant differences in sintering kinetics or in shrinkage behaviour between the different layers. It was found, surprisingly, that the addition of $La_2O_3$ is particularly suitable for aligning the sintering behaviour of the different layers. In particular, the addition of $La_2O_3$ makes it possible to compensate different sintering behaviour, which is caused by different properties of the starting powders such as BET specific surface area of the powder, particle size, particle shape, pressing behaviour and chemical composition, in particular through additives for improving the colour and translucence properties.

According to the invention, those blanks are preferred in which at least one layer contains 0.005 to 5 wt.-%, in particular 0.01 to 1.0 wt.-%, preferably 0.025 to 0.5 wt.-% and most preferably 0.03 to 0.20 wt.-% $La_2O_3$.

Moreover, blanks are preferred, wherein at least one layer comprises $Al_2O_3$ and/or MgO. It has been shown that the sintering behaviour of the different layers can be aligned particularly well by the additional use of $Al_2O_3$ and MgO.

Such blanks are preferred, wherein the at least one layer comprises 0.001 to 5 wt.-%, in particular 0.005 to 1.0 wt.-%, preferably 0.01 to 0.20 wt.-% and most preferably 0.02 to 0.10 wt.-% $Al_2O_3$ and/or MgO.

In particular such blanks are preferred, wherein the at least one layer comprises 0.001 to 5 wt.-%, in particular 0.005 to 1.0 wt.-%, preferably 0.01 to 0.10 wt.-% and most preferably 0.02 to 0.05 wt.-% $Al_2O_3$. Likewise, such blanks are preferred, wherein the at least one layer comprises 0.001 to 5 wt.-%, in particular 0.005 to 1.0 wt.-%, preferably 0.01 to 0.10 wt.-% and most preferably 0.01 to 0.03 wt.-% MgO.

In addition, such blanks are preferred, wherein the at least one layer comprises $Al_2O_3$ and MgO in a weight ratio of 10:1 to 1:10, preferably 5:1 to 1:1 and particularly preferably 4:1 to 2:1.

Particularly preferred are such blanks, wherein at least one layer comprises $La_2O_3$, in particular in the above defined amounts, and at least one other layer comprises $Al_2O_3$ and/or MgO, in particular in the above defined amounts.

In a preferred embodiment, at least one layer contains and preferably all layers of the blank according to the invention contain $Y_2O_3$. It is preferred that at least one layer and preferably all layers contain 0.1 to 20.0 wt.-%, in particular 1.0 to 15.0 wt.-%, preferably 5.0 to 12.5 wt.-% and most preferably 7.0 to 9.5 wt.-% $Y_2O_3$. It has been shown that the addition of $Y_2O_3$ is particularly suitable for conferring on the blanks and the dental products produced therefrom colour and, in particular, translucence properties, which are able to imitate the corresponding properties of the natural tooth material particularly well. Furthermore, it is preferred that the at least two different layers differ in their content of $Y_2O_3$. It is particularly preferred that the difference in the $Y_2O_3$ content between the layer with the lowest $Y_2O_3$ content and the layer with the highest $Y_2O_3$ content is at least 1.0 wt.-%, preferably at least 1.5 wt.-% and in particular at least 1.8 wt.-%, more preferably at least 2.0 wt.-% and in particular at least 2.5 wt.-%, even more preferred at least 3.0 wt.-% and in particular at least 3.5 wt.-% and most preferred at least 3.8 wt.-%.

According to the invention, it is particularly preferred that the layer with the lowest content comprises $La_2O_3$ and/or the layer with the highest $Y_2O_3$ content comprises $Al_2O_3$ and/or MgO. It has unexpectedly been shown that on the one hand the use of $La_2O_3$ in layers with low $Y_2O_3$ content and on the other hand the use of $Al_2O_3$ and/or MgO in layers with high $Y_2O_3$ content is particularly suitable to align the sintering behaviour of layers with different amounts of $Y_2O_3$.

It is particularly preferred that the layer with the lowest $Y_2O_3$ content comprises 0.005 to 5 wt.-%, in particular 0.01 to 1.0 wt.-%, preferably 0.25 to 0.09 wt.-% and most preferably 0.5 to 0.8 wt.-% $La_2O_3$. It is further preferred that the layer with the highest $Y_2O_3$ content comprises 0.001 to 5 wt.-%, in particular 0.005 to 1.0 wt.-%, preferably 0.01 to 0.20 wt.-% and most preferably 0.02 to 0.10 wt.-% $Al_2O_3$ and/or MgO.

In a particularly preferred embodiment of the blank according to the invention, the proportion by weight of $La_2O_3$ in each of the at least two different layers is calculated according to the following formula:

$$m(La_2O_3) = m_{min}(La_2O_3) + (m_{max}(Y_2O_3) - m(Y_2O_3)) * f,$$

wherein $m(La_2O_3)$ is the proportion by weight of $La_2O_3$ in the respective layer, $m_{min}(La_2O_3)$ is the minimum proportion by weight of $La_2O_3$ of all layers, $m(Y_2O_3)$ is the proportion by weight of $Y_2O_3$ in the respective layer, $m_{max}(Y_2O_3)$ is the maximum proportion by weight of $Y_2O_3$ of all layers, and f is in the range of from 0.01 to 1.00, in particular in the range of from 0.03 to 0.20, preferably in the range of from 0.06 to 0.10, particularly preferably in the range of from 0.065 to 0.085 and most preferably in the range of from 0.081 to 0.083.

Oxide ceramics are generally highly crystalline ceramic materials which are based on oxide compounds and comprise, at the most, a very low proportion of glass phase. Typical oxide ceramics are based on $ZrO_2$, $Al_2O_3$, $TiO_2$, MgO, combinations, solid solutions and composites thereof. Oxide ceramics based on $ZrO_2$ and/or $Al_2O_3$ are particularly preferred.

Quite particularly preferred are oxide ceramics based on zirconia and in particular based on tetragonal zirconia polycrystal (TZP) which are suitably stabilized for example by $Y_2O_3$, $CeO_2$, MgO and/or CaO. Particularly preferred oxide ceramics are yttria-stabilized tetragonal zirconia polycrystal (Y-TZP), cerium oxide-stabilized tetragonal zirconia polycrystal (Ce-TZP), zirconia toughened alumina (ZTA) and alumina toughened zirconia (ATZ).

It is particularly preferred for the total amount of $ZrO_2$, $Y_2O_3$ and $HfO_2$ in the oxide ceramic based on zirconia to be at least 99.0 wt.-%. It is further preferred that the oxide ceramic based on zirconia contains the following components in the stated amounts:

$Y_2O_3$ 2.0 to 10.0 wt.-%, in particular 4.5 to 6.0 wt.-%,
$HfO_2$ up to 5.0 wt.-%,
$Al_2O_3$ up to 5.0 wt.-%, in particular up to 0.5 wt.-%,
$SiO_2$ up to 0.1 wt.-%, and
$Na_2O$ up to 0.1 wt.-%.

The blanks according to the invention are suitable in particular for the production of dental products and in particular for the production of multi-unit dental restorations. The blanks according to the invention are quite particularly suitable for the production of dental restorations, in particular of bridges, which comprise two or more units.

The different layers of the blank usually have different colours. Within the meaning of the present application, the terms "colour" and "coloured" relate to the colour, brightness and/or translucence of a layer.

"Translucence" is the light-transmitting capacity of a material, body or layer, i.e. the ratio of transmitted to irradiated light intensity.

Colours can also be characterized by their L*a*b values or by a colour code commonly used in the dental industry. Examples of such colour codes are Vitapan Classical® and Vita 3D Master®, both from VITA Zahnfabrik H. Rauter GmbH & Co. KG, and Chromascop® from Ivoclar Vivadent AG.

It is particularly preferred that the colours of the different layers are in the range of the colours of natural teeth.

The layers are preferably planar layers which are arranged parallel to each other. The blank is preferably in the form of a rectangular block, a disc, a cylinder, a dental preform, an abutment preform, a tooth sector, a horseshoe, a cone, a cone segment, a pyramid, a pyramid segment, a torus, a torus segment, a conical frustum, a conical frustum segment, a tube, a tube segment, a sphere, a spherical segment, an ellipsoid or an ellipsoid segment, in each case with or without notch or ledge.

In a further preferred embodiment, the blank according to the invention is characterized in that it has a coefficient of distortion.

$$d = \frac{(HV_{max} - HV_{min})}{\overline{HV}}$$

of less than 0.4, in particular less than 0.35, in particular less than 0.3, preferably less than 0.25, further preferably less than 0.2 and most preferably less than 0.1, wherein the coefficient is calculated on the basis of at least one measurement of HV for each of the different layers, wherein:
HV is the Vickers hardness measured at a load in the range of from 2.5 to 5.0 kgf (24.517 to 49.034 N) and in particular at a load of 5.0 kgf (49.034 N) in accordance with ISO 14705:2008;
$HV_{max}$ is the maximum of the measured values of HV;
$HV_{min}$ is the minimum of the measured values of HV; and
$\overline{HV}$ is the arithmetic mean of the measured values of HV.

The Vickers hardness according to the standard ISO 14705:2008 is particularly suitable for predicting the sintering behaviour of different areas within the presintered multilayer blank.

The calculation of the coefficient of distortion should generally be based on a plurality of measurements of Vickers hardness at positions which cover each of the different layers of the blank. It is also possible to include measurements of the Vickers hardness on interior surfaces of the blank that become accessible by cutting the blank into individual segments or discs. It is further preferred that the measurements cover a part of the blank that is at least as large as a typical restoration to be produced from the blank.

In one embodiment, the coefficient of distortion is calculated on the basis of measurements of HV at measuring points which are distributed at a constant spacing along a first line intersecting the different layers on an outer surface of the blank. Preferably, additional measuring points are distributed at a constant spacing along a second line that is parallel to the first line on a surface in the centre of the blank, which has been made accessible by cutting the blank.

It is particularly preferred that the constant spacing between the measuring points along the first and second lines is not more than 5 mm. It is further preferred that the surface in the centre of the blank has been made accessible by cutting the blank in half.

The HV values of presintered ceramic materials for CAD/CAM applications are typically in the range of from 300 to 1000 MPa.

The invention also relates to a multilayer oxide ceramic green body for the production of dental restorations, which comprises at least two different layers, wherein at least one layer contains $La_2O_3$ and the at least two different layers differ in their content of $La_2O_3$. Preferred embodiments of the oxide ceramic green body are as defined above for the oxide ceramic blank according to the invention.

In a preferred embodiment, the oxide ceramic green body according to the invention is characterized in that it has a coefficient of distortion.

$$d = \frac{(HV_{max} - HV_{min})}{\overline{HV}}$$

of less than 0.4, in particular less than 0.35, in particular less than 0.3, preferably less than 0.25, further preferably less than 0.2 and most preferably less than 0.1, wherein the coefficient is calculated on the basis of at least one measurement of HV for each of the different layers, after a sintering step at a temperature in the range of from 850 to 1350° C., in particular 900 to 1200° C., preferably 950 to 1150° C., further preferably 1000 to 1100° C. and most preferably at a temperature of about 1100° C., wherein:
HV is the Vickers hardness measured at a load in the range of from 2.5 to 5.0 kgf (24.517 to 49.034 N) and in particular at a load of 5.0 kgf (49.034 N) in accordance with ISO 14705:2008;
$HV_{max}$ is the maximum of the measured values of HV;
$HV_{min}$ is the minimum of the measured values of HV; and
$\overline{HV}$ is the arithmetic mean of the measured values of HV.

In the sintering step, the green body is preferably heated at heating rates of 1 to 10 K/min, preferably 5 K/min, up to a temperature of 50 K below the desired sintering temperature and 1 to 3 K/min, preferably 1 K/min, up to the desired sintering temperature, preferably about 1100° C., and kept at this temperature for 30 to 480 min, preferably 120 to 180 min. In a particular embodiment, the green body is heated at heating rates of 5 K/min up to a temperature of 50 K below the desired sintering temperature and 1 K/min up to the desired sintering temperature, preferably about 1100° C., and kept at this temperature for 120 min. If the green body contains binder, the sintering step is typically preceded by a debinding step which preferably comprises heating at a heating rate of 0.1 to 0.5 K/min, preferably 0.1 to 0.3 K/min and further preferably 0.25 K/min, up to 300° C., 500° C. or 700° C. with holding times of 20 to 120 min, preferably 60 min, at 300° C. and/or 500° C. and/or 700° C. In a particular embodiment, the debinding step comprises heating at a heating rate of 0.25 K/min up to 700° C. with holding times of 60 min at 300° C., 500° C. and 700° C.

Within the meaning of this application, the term "green body" generally relates to an unsintered ceramic body, which has typically been produced by densifying, such as compressing, of oxide ceramic powder.

The sintering behaviour of the at least two different layers of the blank according to the invention or of the green body according to the invention is preferably aligned in such a way that the blank or green body can sinter without distortion.

Furthermore, the invention relates to a process for the production of the blank according to the invention and of the green body according to the invention. This process is characterized in that (a) at least one first oxide ceramic material and one second oxide ceramic material are provided which differ in terms of their chemical composition,
(b) $La_2O_3$ is added to at least one of the oxide ceramic materials, and
(c) optionally, $Al_2O_3$ and/or MgO is added to at least one of the oxide ceramic materials.

It is further preferred that at least one of the oxide ceramic materials and preferably both oxide ceramic materials contain $Y_2O_3$, wherein it is particularly preferred that the first oxide ceramic material and the second oxide ceramic material differ in terms of their $Y_2O_3$ content.

In a preferred embodiment of the process according to the invention, at least one oxide ceramic material is infiltrated with $La_2O_3$ and/or at least one oxide ceramic material is infiltrated with $Al_2O_3$ and/or MgO. Suitable infiltration methods are described, for example, in US 2014/135200 A1.

In another preferred embodiment of the process according to the invention, at least one oxide ceramic material is coated with $La_2O_3$ and/or at least one oxide ceramic material is coated with $Al_2O_3$ and/or MgO. Suitable coating methods are described, for example, in US 2007/292597 A1.

According to a further preferred embodiment, the process according to the invention is further characterized in that (d) layers of the oxide ceramic materials are formed and the layers are arranged one on the other,
(e) the oxide ceramic materials are compacted and in particular compressed in order to obtain the green body, and
(f) optionally, the green body is presintered in order to obtain the presintered ceramic blank.

In a quite particularly preferred embodiment, the layers of the oxide ceramic materials exhibit a continuous change of composition from the composition of the first oxide ceramic material to the composition of the second oxide ceramic material. This makes it possible to form a continuous colour gradient without visible borders and transitions between individual layers.

Finally, the invention also relates to a multilayer oxide ceramic blank or green body which is obtainable by the process according to the invention. Preferred embodiments of the oxide ceramic blank or green body are as described above for the oxide ceramic blank according to the invention.

The multilayer oxide ceramic bodies according to the invention are particularly suitable for the production of dental restorations. The invention therefore also relates to processes for the production of a dental restoration in which a blank according to the invention or a green body according to the invention is used.

In the process for the production of a dental restoration, the multilayer oxide ceramic body is preferably given the shape of a desired geometry in order to obtain a shaped ceramic product. It is preferred that the shaping is carried out by machining. The machining is typically controlled by a computer, preferably using a CAD/CAM process.

In a preferred embodiment, the shaped ceramic product has the shape of a dental framework or abutment or a monolithic fully anatomical dental restoration, in particular a multi-unit dental restoration.

It is further preferred that the shaped ceramic product is also densely sintered.

The invention is explained in more detail in the following with reference to examples.

EXAMPLES

General Process for the Treatment of Oxide Powders With Colouring Agents and/or Dopants The treatment of oxide powders in the following examples was carried out analogously to US 2014/135200 A1.

For this purpose, an aqueous treatment solution was prepared, which contained a suitable amount of water-soluble nitrates of the elements with which the oxide powder was intended to be treated. A suitable amount of oxide powder (for example 1,000 g) was introduced into the mixing vessel of an "EL1" laboratory mixer (Eirich, Hardheim), which furthermore had an agitator (star-shaped agitator) and a spray nozzle (0.3 mm hollow cone) for applying a solution. The mixing vessel was set in motion at a speed of 13 m/s and the oxide powder located therein was uniformly stirred by the agitator. Then, about 0.1 g treatment solution per 1 g oxide powder were applied to the oxide powder via the spray nozzle with the aid of a 120S/DV-type peristaltic pump (Watson Marlow, Rommerskirchen; speed 170 rpm), thus infiltrating the oxide powder uniformly with the treatment solution.

Example 1

Aligning the Sintering Behaviour of a Two-Layer Blank Made of Zirconia Powders With Different Yttrium Content by Doping With $La_2O_3$ For the preparation of coloured zirconia powders, commercially available zirconia powders (TOSOH TZ-PX-471 and TOSOH Zpex Smile) were used as raw materials and were treated with solutions of nitrate salts of colouring elements and optionally lanthanum as dopant according to the following table using the general process. Thereby, a powder (L1) suitable for a dentine layer and a powder (L2) suitable for a cutting layer were obtained:

| Powder | Starting powder | Colouring elements [1] | Dopant |
|---|---|---|---|
| L2 Cutting | TOSOH Zpex Smile[2] | 0.028 wt.-% Fe[4] <br> 0.0014 wt.-% Cr[5] <br> 0.2283 wt.-% Er[7] | — |

-continued

| Powder | Starting powder | Colouring elements [1] | Dopant |
|---|---|---|---|
| L1 Dentine | TOSOH TZ-PX-471[3] | 0.0091 wt.-% Fe[4]<br>0.0024 wt.-% Cr[5]<br>0.002 wt.-% Pr[6]<br>0.3981 wt.-% Er[7] | 0.1537 wt.-% La[8] |

[1] based on the total weight of the oxide mixture after the sintering
[2] contains 9.25 wt.-% $Y_2O_3$ and 0.048 wt.-% $Al_2O_3$
[3] contains 7.37 wt.-% $Y_2O_3$ and 0.048 wt.-% $Al_2O_3$
[4] calculated as $Fe_2O_3$
[5] calculated as $Cr_2O_3$
[6] calculated as $Pr_2O_3$
[7] calculated as $Er_2O_3$
[8] calculated as $La_2O_3$ Subsequently, about 10 g of each of the coloured zirconia powders was introduced one after the other into the pressing die (diameter about 40 mm) of a laboratory axial press in two layers (at the bottom: L1, on top: L2) and densified axially under a pressure of about 160 MPa. The green body obtained in this way was debound and presintered using the following firing programme:

60 K/min to 120° C.,
24 K/min to 200° C.,
10 K/min to 320° C.,
60 K/min to 1050° C., holding time 3 h.

An about 2 mm thick section was sawn out of the debound and presintered blank obtained in this way using a saw (IsoMet 4000, Buehler, Esslingen). A paper or ruler edge was laid on the two lower outer edges of the section as a reference line and the area of maximum bending was measured under a stereo microscope (SZX 16, Olympus, Hamburg). The results are shown in FIGS. 1A (overview) and 1B (detailed view). The presintered blank showed only a negligible bending of 0.03 mm.

Finally, the section of the presintered blank was densely sintered in a Programat S1 furnace (Ivoclar Vivadent AG, Schaan) using the following firing and cooling programme:

600 K/h to 900° C., holding time 0.5 h
200 K/h to 1500° C., holding time 2 h
600 K/h to 900° C.,
500 K/h to 300° C.

Figure 2:
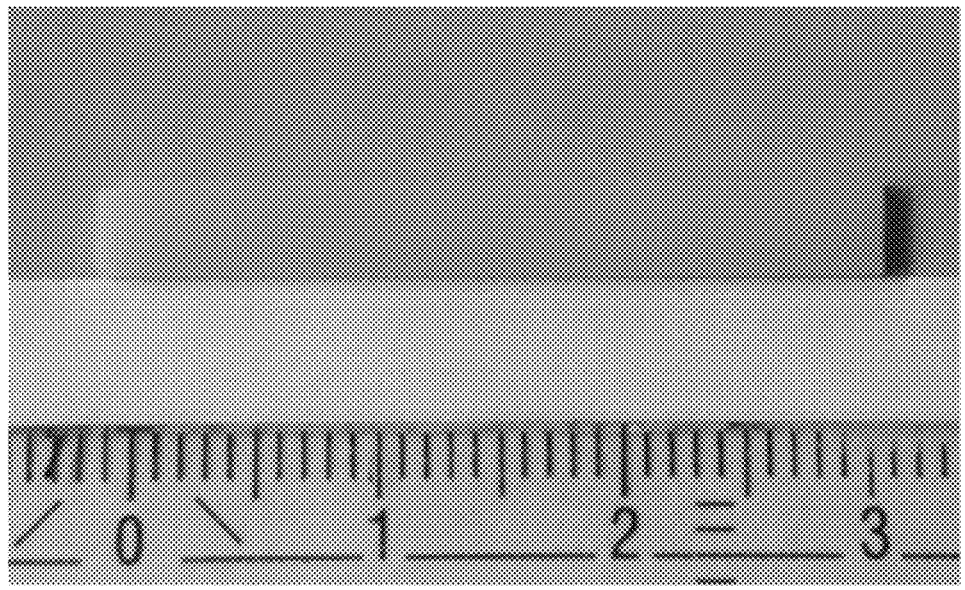
FIG. 2A shows an overview of a densely sintered blank positioned against a ruler or paper edge to measure bending.
FIG. 2B shows a detailed view of a densely sintered blank positioned against a ruler or paper edge to measure bending.
Figure 2:
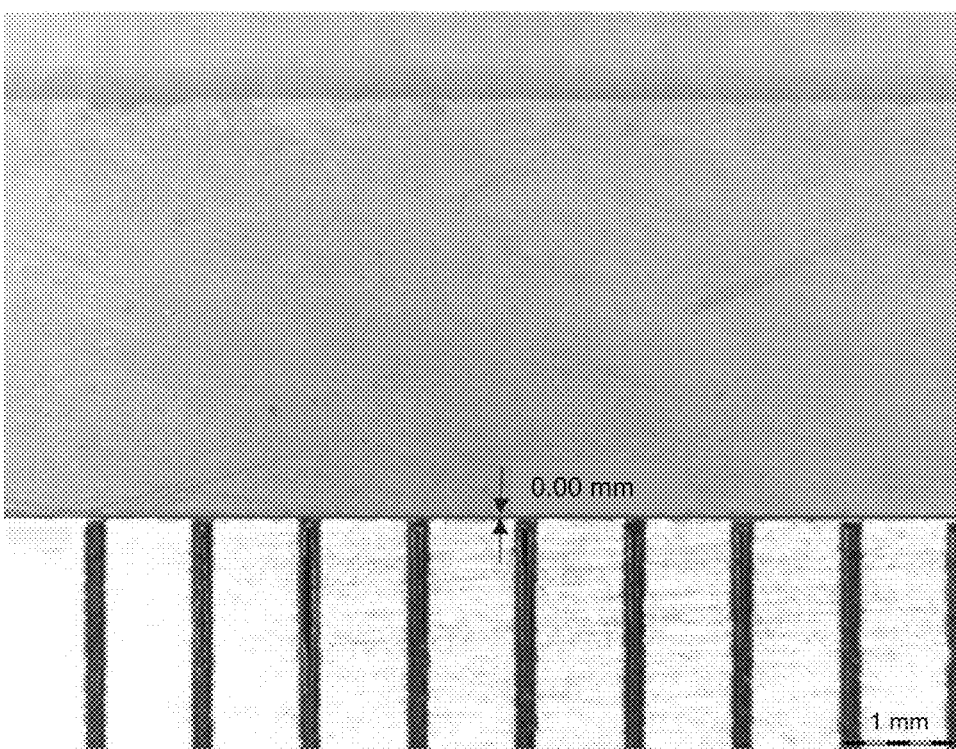

The section of the densely sintered blank was in turn measured under the stereo microscope as described above. The results are shown in FIGS. 2A (overview) and 2B (detailed view). The densely sintered blank showed no measurable bending.

Example 2 (Comparison)

Figure 3:
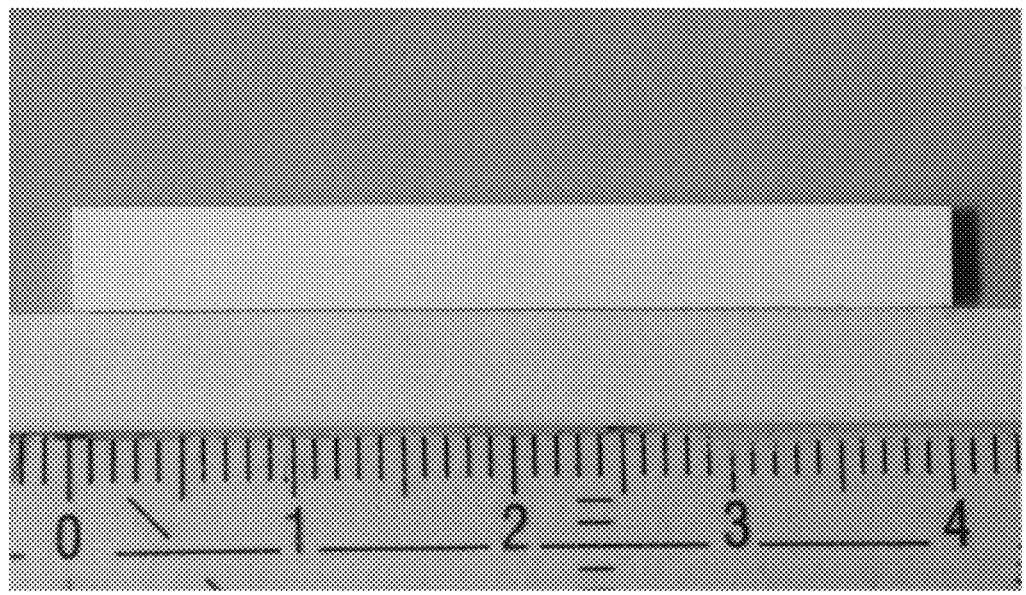
FIG. 3A shows an overview of a presintered blank positioned against a ruler or paper edge to measure bending.
FIG. 3B shows a detailed view of a presintered blank positioned against a ruler or paper edge to measure bending.
Figure 3:
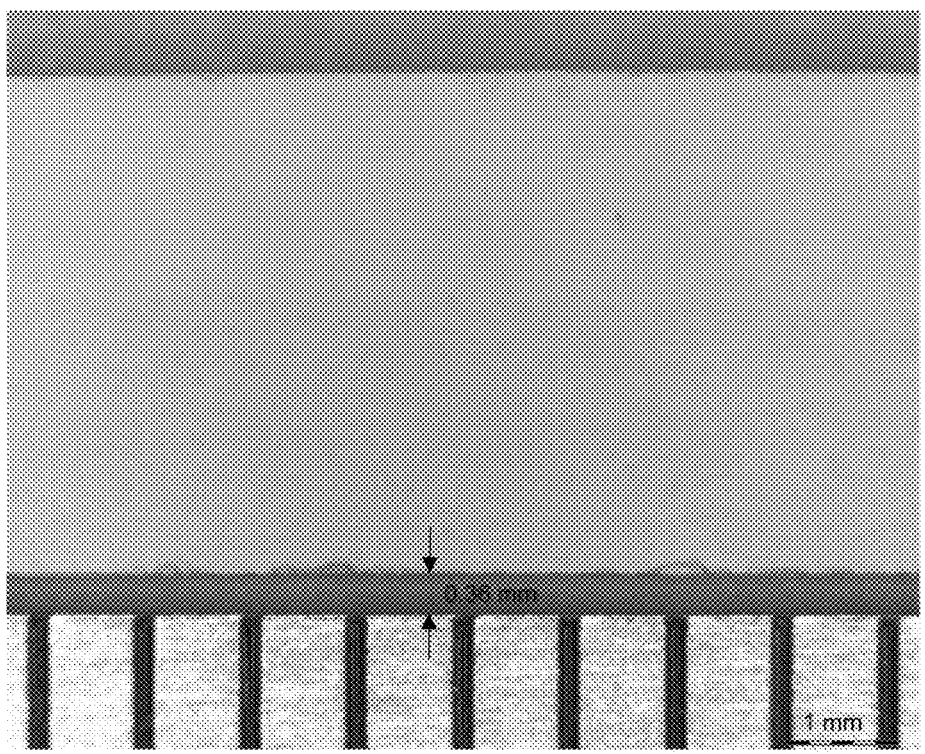
Figure 4:
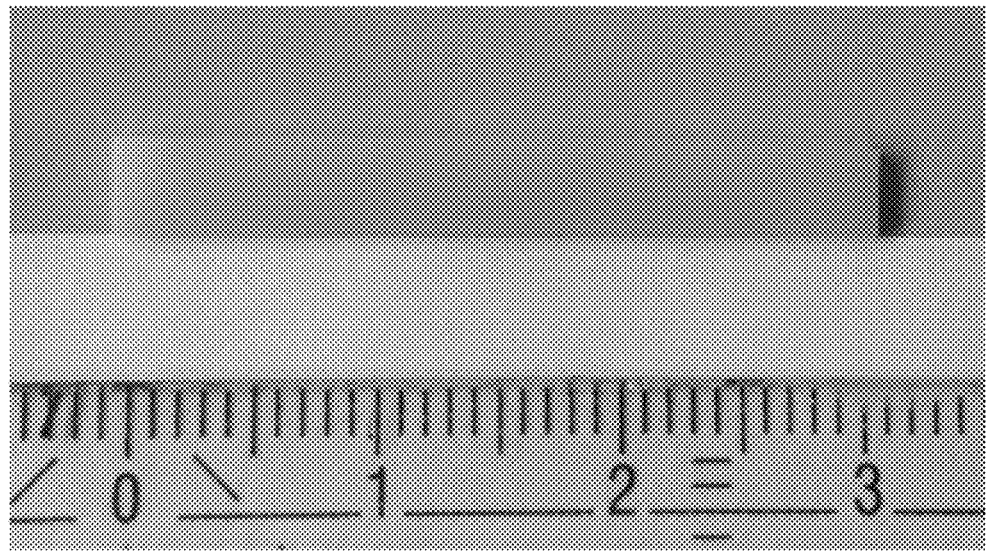
FIG. 4A shows an overview of a densely sintered blank positioned against a ruler or paper edge to measure bending.
FIG. 4B shows a detailed view of a densely sintered blank positioned against a ruler or paper edge to measure bending.
Figure 4:
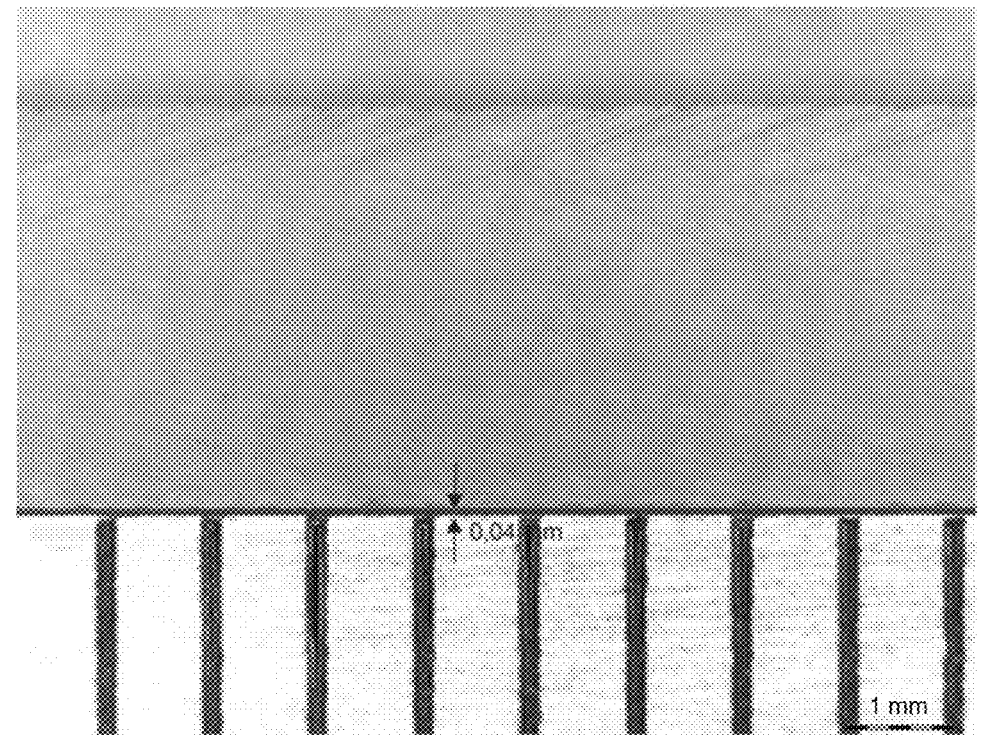

Sintering Behaviour of a Two-Layer Blank Made of Zirconia Powders With Different Yttrium Content Without Doping With $La_2O_3$ Example 1 was repeated identically, wherein however no lanthanum was added as dopant. The results for the debound and presintered blank are shown in FIGS. 3A (overview) and 3B (detailed view). Therein, it can be clearly seen that the dentine layer (L1) has shrunk more than the cutting layer (L2), whereby the blank has obtained a convex shape. The bending of the blank was 0.36 mm. The results after the dense sintering of the blank are shown in FIGS. 4A (overview) and 4B (detailed view). Even the densely sintered blank still showed a bending of 0.04 mm thereafter.

Example 3

Aligning the Sintering Behaviour of a Four-Layer Blank Made of Zirconia Powders With Different Yttrium Content by Doping With $La_2O_3$ For the preparation of coloured zirconia powders, commercially available zirconia powders (TOSOH TZ-PX-471 and TOSOH Zpex Smile) were used as raw materials and were treated with solutions of nitrate salts of colouring elements and optionally lanthanum as dopant according to the following table using the general process. Thereby, a powder (L1) suitable for a dentine layer and a powder (L4) suitable for a cutting layer were obtained. By mixing these powders in the ratio 1:2 or 2:1, respectively, using a shaker mixer (Turbula, WAB, Muttenz), two powders suitable for intermediate layers were obtained in addition:

| Powder | Starting powder | Colouring elements [1] | Dopant |
|---|---|---|---|
| L4 Cutting | TOSOH Zpex Smile[2] | 0.028 wt.-% Fe[4]<br>0.0014 wt.-% Cr[5]<br>0.2283 wt.-% Er[7] | — |
| L3 Intermediate layer 2 | Mixture of TOSOH Zpex Smile[2] and TOSOH TZ-PX-471[3] (2:1) | 0.0489 wt.-% Fe[4]<br>0.0017 wt.-% Cr[5]<br>0.0007 wt.-% Pr[6]<br>0.2849 wt.-% Er[7] | 0.0512 wt.-% La[8] |
| L2 Intermediate layer 1 | Mixture of TOSH Zpex Smile[2] and TOSOH TZ-PX-471[3] (1:2) | 0.0698 wt.-% Fe[4]<br>0.0021 wt.-% Cr[5]<br>0.0014 wt.-% Pr[6]<br>0.3415 wt.-% Er[7] | 0.1025 wt.-% La[8] |
| L1 Dentine | TOSOH TZ-PX-471[3] | 0.0091 wt.-% Fe[4]<br>0.0024 wt.-% Cr[5]<br>0.002 wt.-% Pr[6]<br>0.3981 wt.-%Er[7] | 0.1537 wt.-% La[8] |

[1] based on the total weight of the oxide mixture after the sinterng
[2] contains 9.25 wt.-% $Y_2O_3$ and 0.048 wt.-% $Al_2O_3$
[3] contains 7.37 wt.-% $Y_2O_3$ and 0.048 wt.-% $Al_2O_3$
[4] calculated as $Fe_2O_3$
[5] calculated as $Cr_2O_3$
[6] calculated as $Pr_2O_3$
[7] calculated as $Er_2O_3$
[8] calculated as $La_2O_3$ Subsequently, about 19 g of each of the coloured zirconia powders was introduced one after the other into the pressing die (diameter about 40 mm) of a laboratory axial compressor in four layers (at the bottom: L1, on top: L4) and densified axially under a pressure of about 160 MPa. The green body obtained in this way was debound and presintered using the following firing programme:

60 K/min to 120° C.,
24 K/min to 200° C.,
10 K/min to 320° C.,
60 K/min to 1050° C., holding time 3 h.

Figure 5:
FIG. 5A shows an overview of a presintered blank positioned against a ruler or paper edge to measure bending.
FIG. 5B shows a detailed view of a presintered blank positioned against a ruler or paper edge to measure bending.
Figure 5:
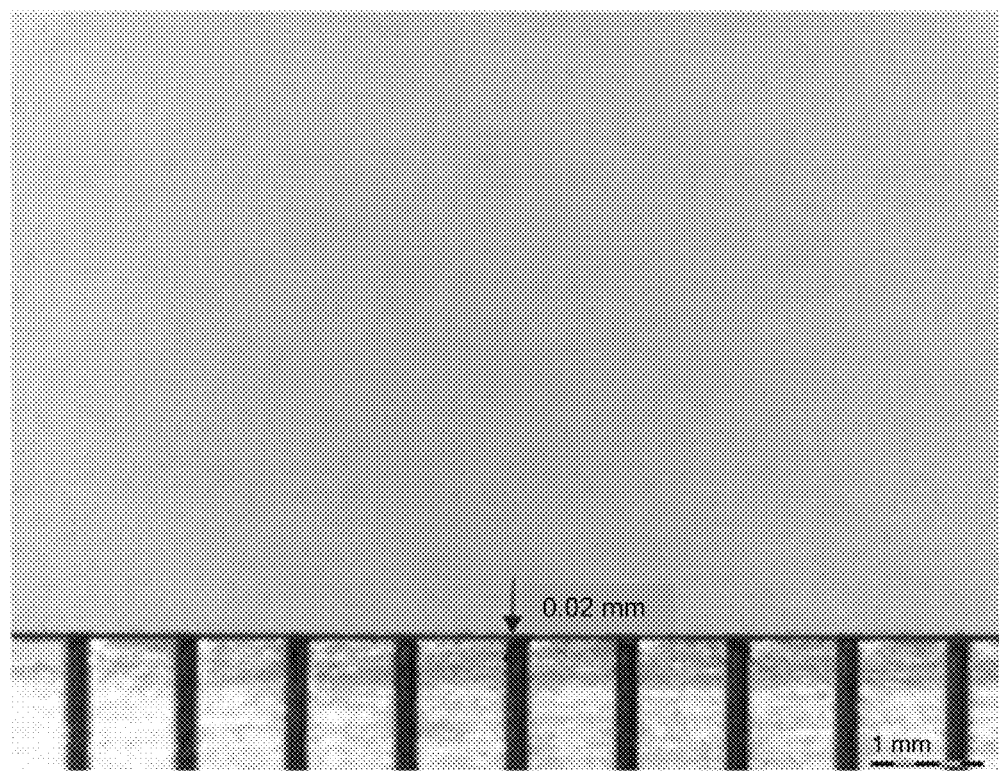

An about 2 mm thick section was sawn out of the debound and presintered blank obtained in this way using a saw (IsoMet 4000, Buehler, Esslingen). A paper or ruler was laid on the two lower outer edges of the section as a reference line and the area of maximum bending was measured under a stereo microscope (SZX 16, Olympus, Hamburg). The results are shown in FIGS. 5A (overview) and 5B (detailed view). The presintered blank showed only a negligible bending of 0.02 mm.

In addition, the development of the Vickers hardness $HV_5$ over the layers was measured on the section of the presintered blank at 10 measuring points at a spacing in each case of 1.5 mm using a hardness testing machine (ZHU 0.2, Zwick Roell, Ulm). The hardness values determined are listed in the following table:

| Measuring point | HV$_5$ [MPa] |
| --- | --- |
| 1 | 583 |
| 2 | 591 |
| 3 | 593 |
| 4 | 584 |
| 5 | 586 |
| 6 | 652 |
| 7 | 623 |
| 8 | 636 |
| 9 | 605 |
| 10 | 597 |

From these values, a coefficient of distortion of d=0.114 was calculated.

Finally, the blank was densely sintered in a Programat S1 furnace (Ivoclar Vivadent AG, Schaan) using the following firing and cooling programme:

600 K/h to 900° C., holding time 0.5 h
200 K/h to 1500° C., holding time 2 h
600 K/h to 900° C.,
500 K/h to 300° C.

Figure 6:
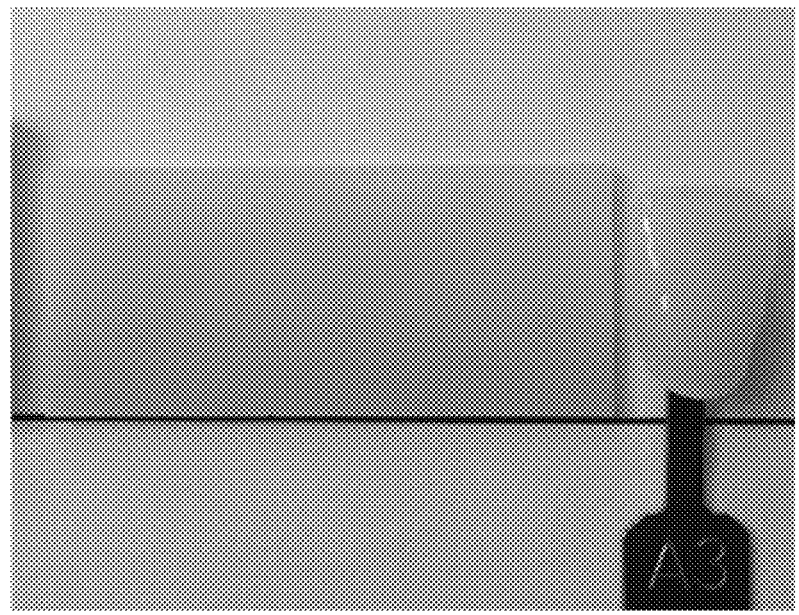
FIG. 6A shows an overview of a densely sintered blank positioned against a ruler or paper edge to measure bending.
FIG. 6B shows a detailed view of a densely sintered blank positioned against a ruler or paper edge to measure bending.
Figure 6:
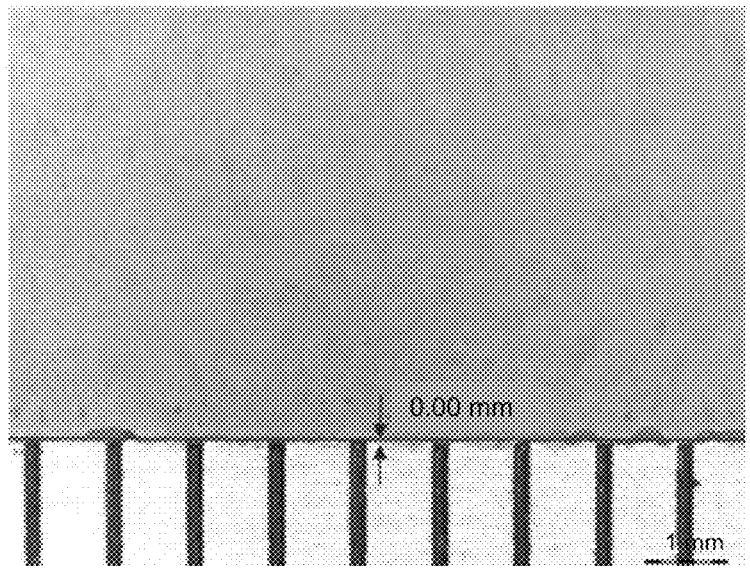

From the densely sintered blank obtained in this way, an about 2 mm thick section was in turn sawn out as described above and measured under the stereo microscope. The results are shown in FIGS. 6A (overview) and 6B (detailed view). The densely sintered blank showed no measurable bending.

Example 4

Figure 7:
FIG. 7 shows a debound and presintered blank.
Figure 8:
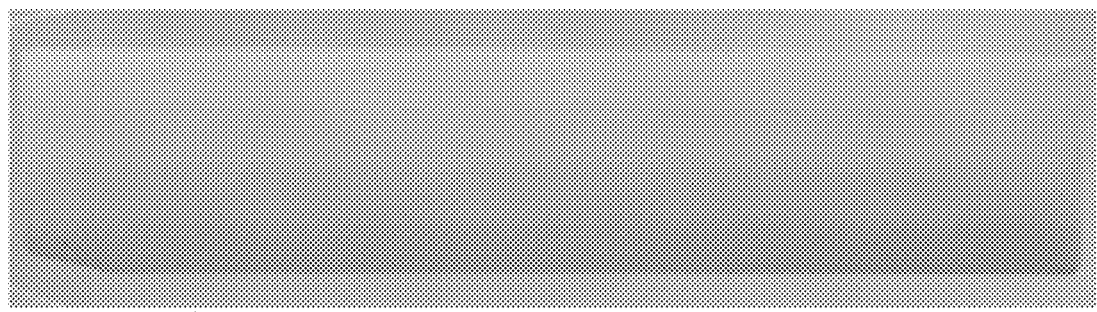
FIG. 8 shows a densely sintered blank in transmitted light.

Aligning the Sintering Behaviour of a Four-Layer Blank Made of Zirconia Powders With Different Yttrium Content by Doping With La$_2$O$_3$ Example 3 was repeated with a larger batch. For this purpose, about 115 g of each of the coloured zirconia powders obtained as in Example 3 was introduced one after the other into the pressing die (diameter about 100 mm) of a powder press in four layers (at the bottom: L1, on top: L4) and densified axially under a pressure of about 160 MPa. The blanks were first of all debound and presintered as described in Example 3 and subsequently densely sintered. From the blanks obtained in this way, in each case about 2 mm thick sections were sawn out and measured under the stereo microscope. The results are shown in FIG. 7 (debound and presintered blank) and FIG. 8 (densely sintered blank in transmitted light). The blanks showed no measurable bending.

In addition, the development of the Vickers hardness HV$_5$ over the layers was measured on the section of the presintered blank at 10 measuring points at a spacing in each case of 2 mm using a hardness testing machine (ZHU 0.2, Zwick Roell, Ulm). The hardness values determined are listed in the following table:

| Measuring point | HV$_5$ [MPa] |
| --- | --- |
| 1 | 581 |
| 2 | 588 |
| 3 | 599 |
| 4 | 600 |
| 5 | 589 |
| 6 | 625 |
| 7 | 634 |
| 8 | 620 |
| 9 | 606 |
| 10 | 613 |

From these values, a coefficient of distortion of d=0.088 was calculated.

Example 5

Aligning the Sintering Behaviour or a Blank With a Continuous Colour and Translucence Profile Made of Zirconia Powders With Different Yttrium Content by Doping With La$_2$O$_3$ For the preparation of coloured zirconia powders, commercially available zirconia powders (TOSOH TZ-PX-471 and TOSOH Zpex Smile) were used as raw materials and were treated with solutions of nitrate salts of colouring elements and optionally lanthanum as dopant according to the following table using the general process. Thereby, a powder (L1) suitable for a dentine layer and a powder (L2) suitable for a cutting layer were obtained:

| Powder | Starting powder | Colouring elements[1] | Dopant |
| --- | --- | --- | --- |
| L2 Cutting | TOSOH Zpex Smile[2] | 0.065 wt-% Fe[4]<br>0.00025 wt-% Mn[5]<br>0.0005 wt-% Pr[6]<br>0.0108 wt-% Tb[7]<br>0.24 wt-% Er[8] | — |
| L1 Dentine | TOSOH TZ-PX-471[3] | 0.092 wt-% Fe[4]<br>0.00063 wt-% Mn[5]<br>0.0008 wt-% Pr[6]<br>0.0108 wt-% Tb[7]<br>0.5 wt-% Er[8] | 0.13 wt-% La[9] |

[1] based on the total weight of the oxide mixture after the sintering
[2] contains 9.25 wt-% Y$_2$O$_3$ and 0.048 wt-% Al$_2$O$_3$
[3] contains 7.37 wt-% Y$_2$O$_3$ and 0.048 wt-% Al$_2$O$_3$
[4] calculated as Fe$_2$O$_3$
[5] calculated as Mn$_2$O$_3$
[6] calculated as Pr$_2$O$_3$
[7] calculated as Tb$_2$O$_3$
[8] calculated as Er$_2$O$_3$
[9] calculated as La$_2$O$_3$ Subsequently, the coloured zirconia powders were introduced into the pressing die (diameter about 100 mm) of a powder press in the form of a continuous gradient using a suitable filling process and densified axially under a pressure of about 160 MPa. The green body obtained in this way was debound and presintered using the following firing programme:

60 K; min to 120° C.,
24 K/mm to 200° C.,
10 K/min to 320° C.,
60 K/min to 1050° C., holding time 3 h.

Figure 9:
FIG. 9A shows an overview of a debound and presintered blank.
FIG. 9B shows a detailed view of a debound and presintered blank.
Figure 9:
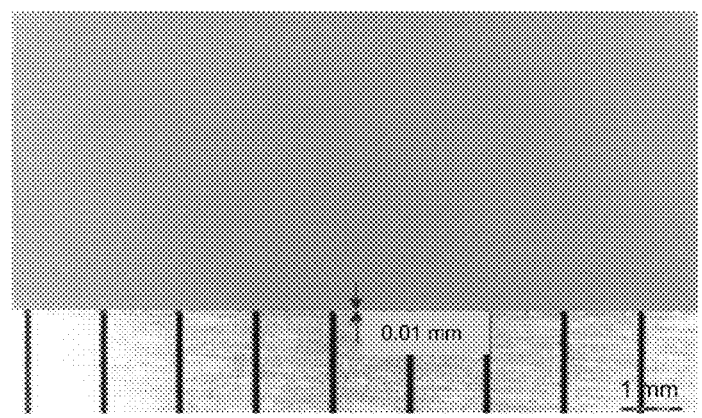

An about 2 mm thick section was sawn out of the debound and presintered blank obtained in this way using a saw (IsoMet 4000, Buehler, Esslingen). A paper or ruler was laid on the two lower outer edges of the section as a reference line and the area of maximum bending was measured under a stereo microscope (SZX 16, Olympus, Hamburg). The results are shown FIGS. 9A (overview) and 9B (detailed view). The presintered blank snowed only a negligible bending of 0.01 mm.

In addition, the development of the Vickers hardness HV$_5$ over the gradient was measured on the section of the presintered blank at 10 measuring points at a spacing in each case of 1.5 mm using a hardness testing machine (ZHU 0.2, Zwick Roell, Ulm). The hardness values determined are listed in the following table:

| Measuring point | HV$_5$ [MPa] |
| --- | --- |
| 1 | 732 |
| 2 | 766 |
| 3 | 780 |
| 4 | 724 |
| 5 | 718 |
| 6 | 744 |
| 7 | 756 |
| 8 | 773 |
| 9 | 754 |
| 10 | 724 |

From these values, a coefficient of distortion of d=0.083 was calculated.

Finally, the section of the presintered blank was densely sintered in a Programat S1 furnace (Ivoclar Vivadent AG, Schaan) using the following firing and cooling programme:
600 K/h to 900° C., holding time 0.5 h
200 K/h to 1500° C., holding time 2 h
600 K/h to 900° C.,
500 K/h to 300° C.

Figure 10:
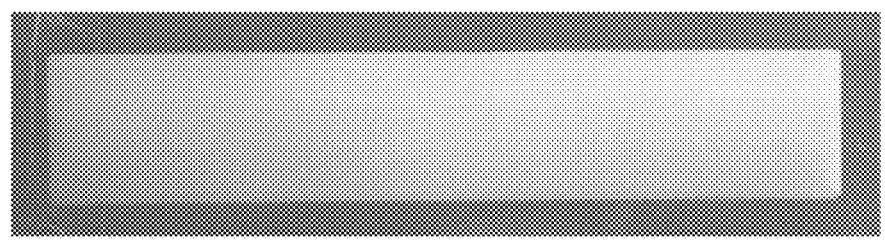
FIG. 10A shows an overview of a densely sintered blank.
FIG. 10B shows a detailed view of a densely sintered blank.
Figure 10:
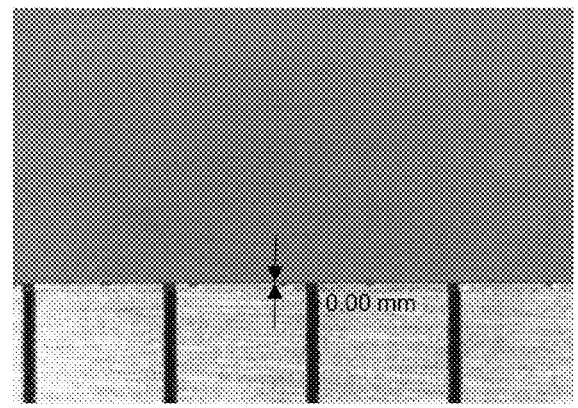

The section of the densely sintered blank was in turn measured under the stereo microscope as described above. The results are shown in FIGS. 10A (overview) and 10B (detailed view). The densely sintered blank showed no measurable bending.

Example 6

Aligning the Sintering Behaviour or a Two-Layer Blank Made of Zirconia Powders With Different Yttrium Content by Doping With La$_2$O$_3$, Al$_2$O$_3$ and MgO For the preparation of coloured zirconia powders, commercially available zirconia powders (TOSOH Zpex and TOSOH Zpex Smile) were used as raw materials and were treated with solutions of nitrate salts of colouring elements and optionally lanthanum or aluminium and magnesium as dopant according to the following table using the general process. Thereby, a powder (L1) suitable for a dentine layer and a powder (L2) suitable for a cutting layer were obtained:

| Powder | Starting powder | Colouring elements [1] | Dopant |
| --- | --- | --- | --- |
| L2 Cutting | TOSOH Zpex Smile[2] | 0.0676 wt.-% Fe[4] <br> 0.0003 wt.-% Mn[5] <br> 0.0005 wt.-% Pr[6] <br> 0.0112 wt.-% Tb[7] <br> 0.2249 wt.-% Er[8] | 0.03 wt.-% Al[9] <br> 0.01 wt.-% Mg[10] |
| L1 Dentine | TOSOH Zpex[3] | 0.0734 wt.-% Fe[4] <br> 0.0006 wt.-% Mn[5] <br> 0.0001 wt.-% Pr[6] <br> 0.0095 wt.-% Tb[7] <br> 0.6647 wt.-% Er[8] | 0.62 wt.-% La[11] |

[1] based on the total weight of the oxide mixture after the sintering
[2] contains 9.25 wt.-% Y$_2$O$_3$ and 0.048 wt.-% Al$_2$O$_3$
[3] contains 5.36 wt.-% Y$_2$O$_3$ and 0.048 wt.-% Al$_2$O$_3$
[4] calculated as Fe$_2$O$_3$
[5] calculated as Mn$_2$O$_3$
[6] calculated as Pr$_2$O$_3$
[7] calculated as Tb$_2$O$_3$
[8] calculated as Er$_2$O$_3$
[9] calculated as Al$_2$O$_3$
[10] calculated as MgO
[11] calculated as La$_2$O$_3$ Subsequently, about 10 g of each of the coloured zirconia powders was introduced one after the other into the pressing die (diameter about 40 mm) of a laboratory axial press in two layers (at the bottom: L1, on top: L2) and densified axially under a pressure of about 160 MPa. The green body obtained in this way was debound and presintered using the following firing programme:
60 K/min to 120° C.,
24 K/min to 200° C.,
10 K/min to 320° C.,
60 K/min to 1010° C., holding time 3 h.

Figure 11:
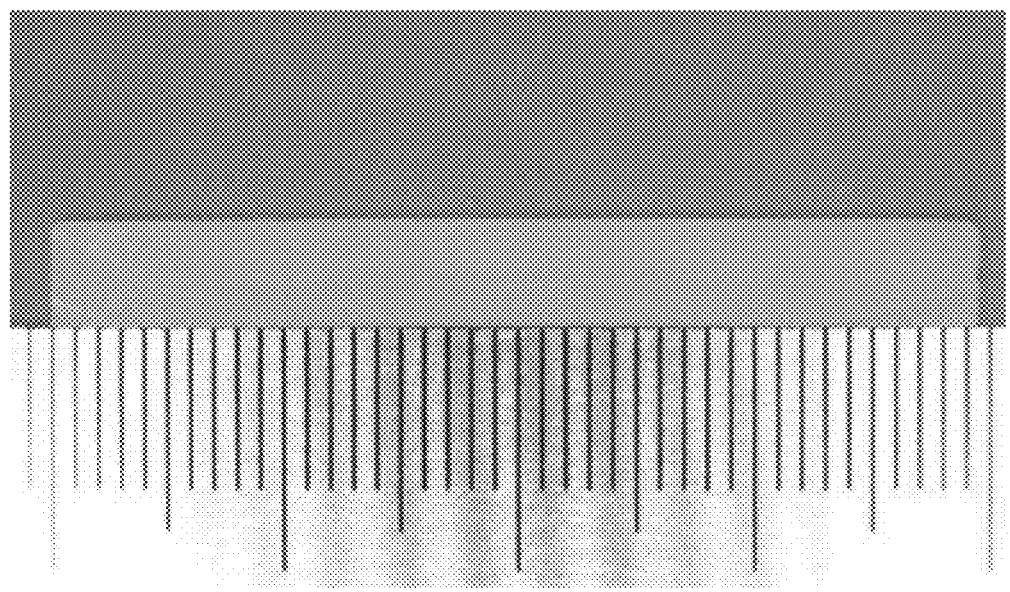
FIG. 11A shows an overview of a debound and presintered blank.
FIG. 11B shows a detailed view of a debound and presintered blank.
Figure 11:
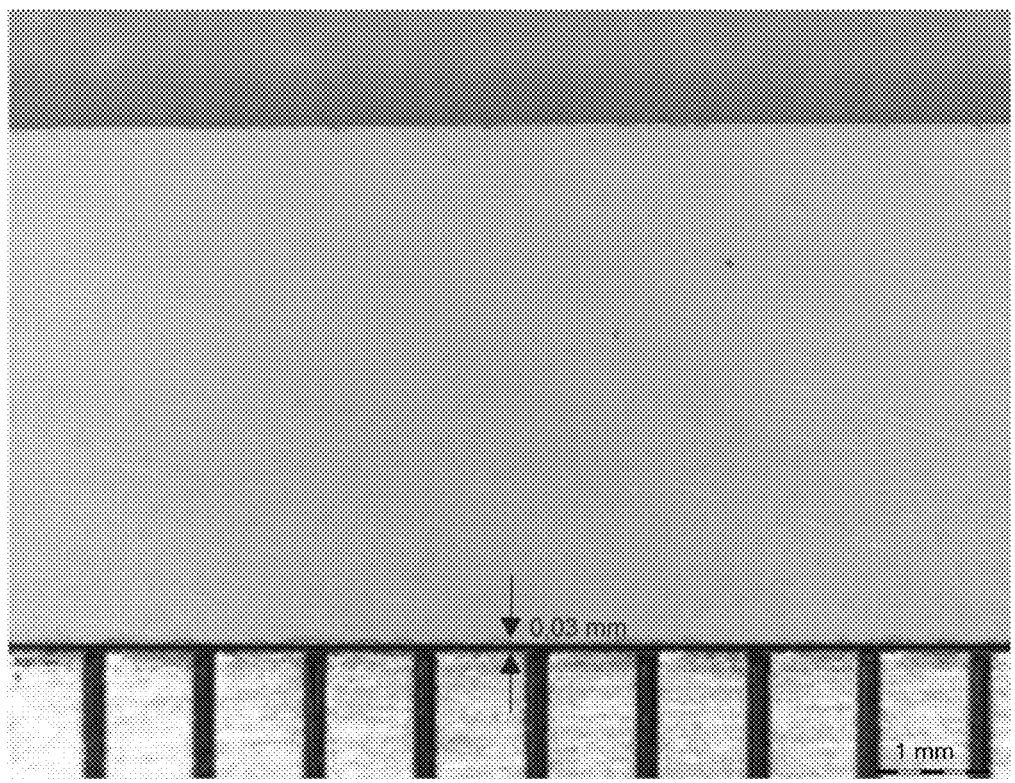

An about 2 mm thick section was sawn out of the debound and presintered blank obtained in this way using a saw (IsoMet 4000, Buehler, Esslingen). A ruler was laid on the two lower outer edges of the section as a reference line and the area of maximum bending was measured under a stereo microscope (SZX 16, Olympus, Hamburg). The results are shown in FIGS. 11A (overview) and 11B (detailed view). The presintered blank showed only a negligible bending of 0.03 mm.

Finally, the section of the presintered blank was densely sintered in a Programat S1 furnace (Ivoclar Vivadent AG, Schaan) using the following firing and cooling programme:
600 K/h to 900° C., holding time 0.5 h
200 K/h to 1500° C., holding time 2 h
600 K/h to 900° C.,
500 K/h to 300° C.

Figure 12:
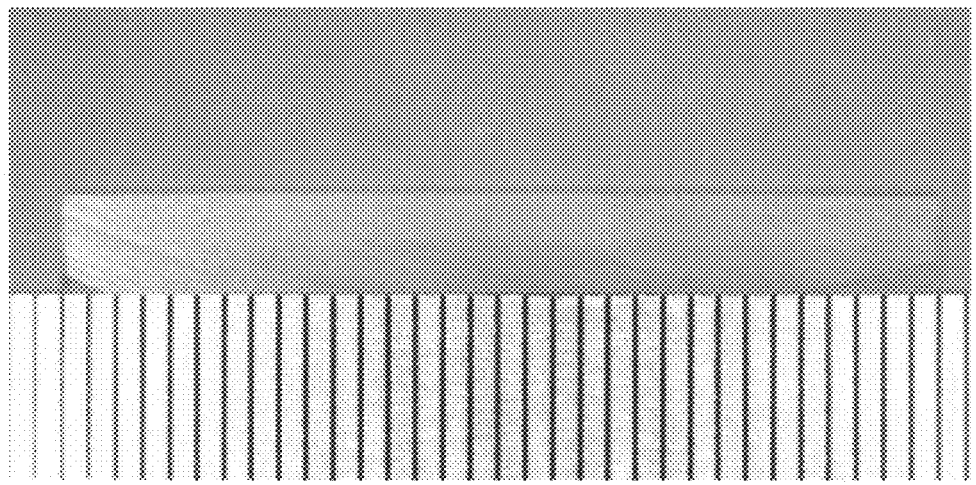
FIG. 12A shows an overview of a densely sintered blank.
FIG. 12B shows a detailed view of a densely sintered blank.
Figure 12:
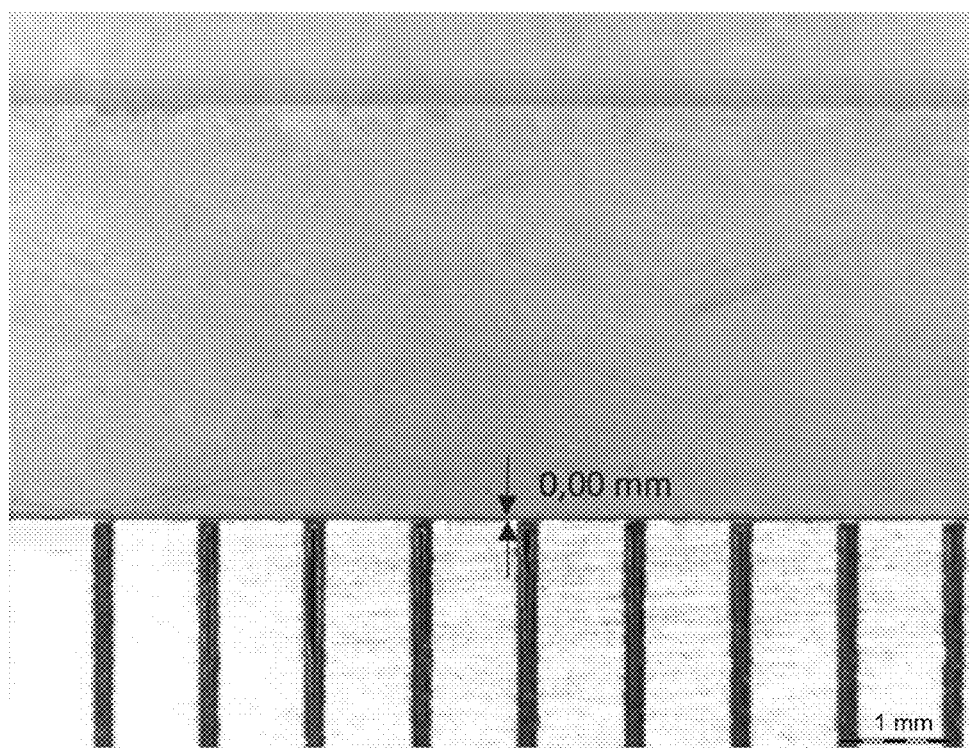

The section of the densely sintered blank was again measured under the stereo microscope as described above. The results are shown in FIGS. 12A (overview) and 12B (detailed view). The densely sintered blank showed no measurable bending.

Example 7 (Comparison)

Figure 13:
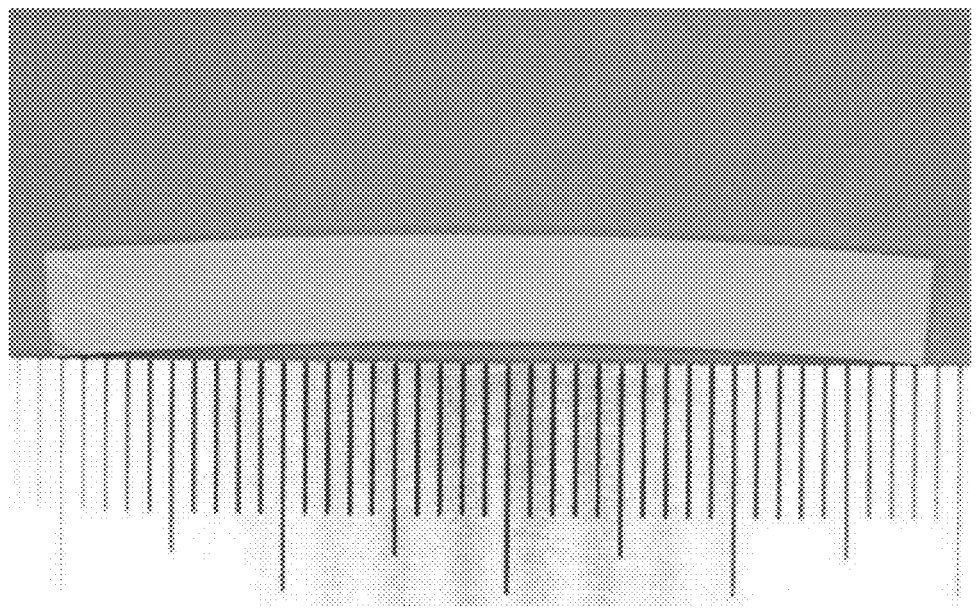
FIG. 13A shows an overview of a debound and presintered blank.
FIG. 13B shows a detailed view of a debound and presintered blank.
Figure 13:
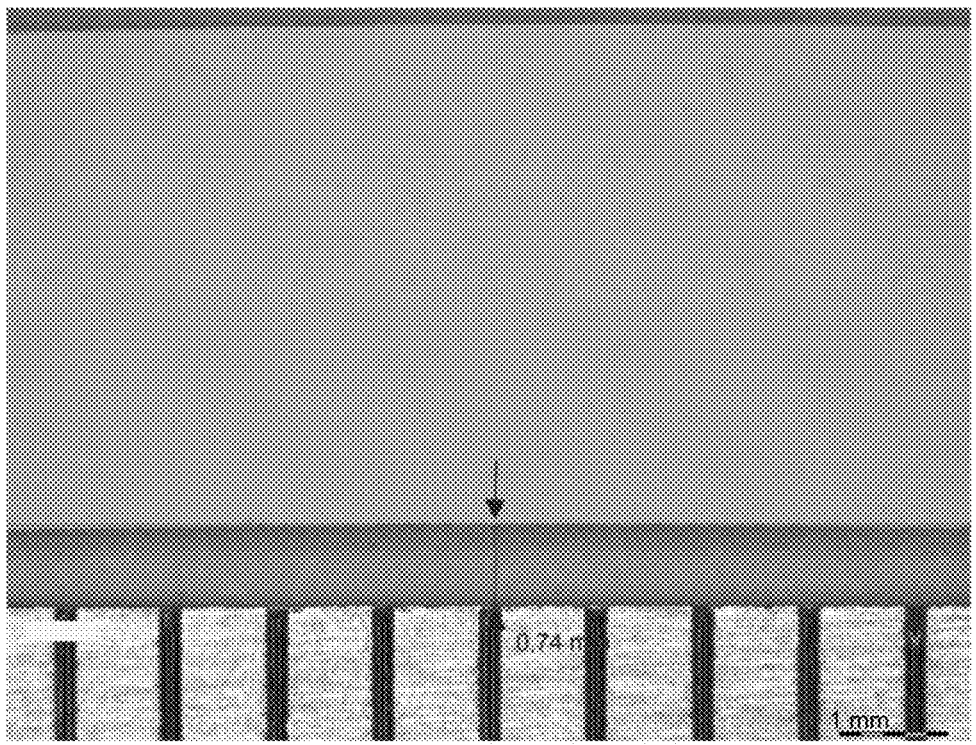
Figure 14:
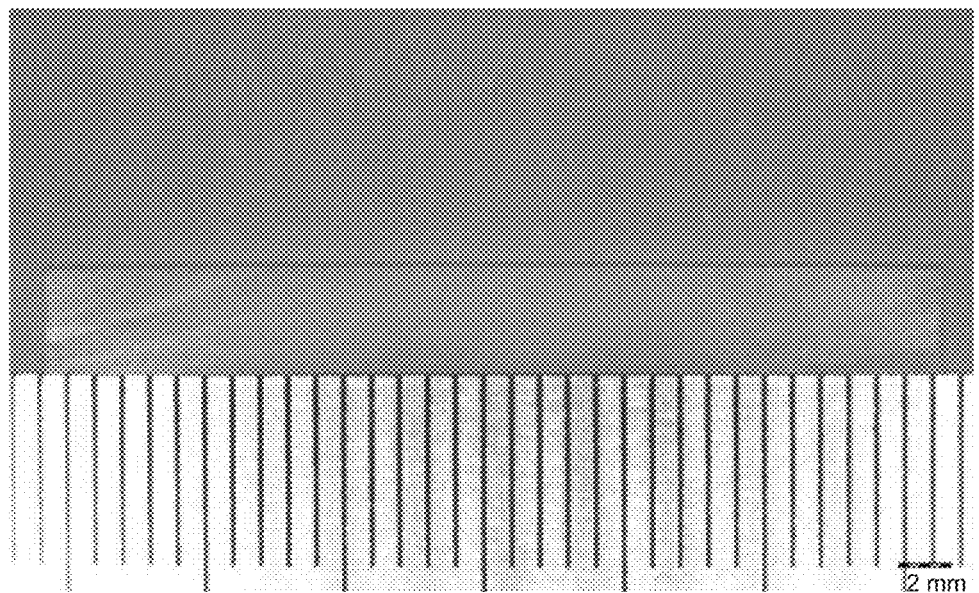
FIG. 14A shows an overview of a densely sintered blank.
FIG. 14B shows a detailed view of a densely sintered blank.
Figure 14:
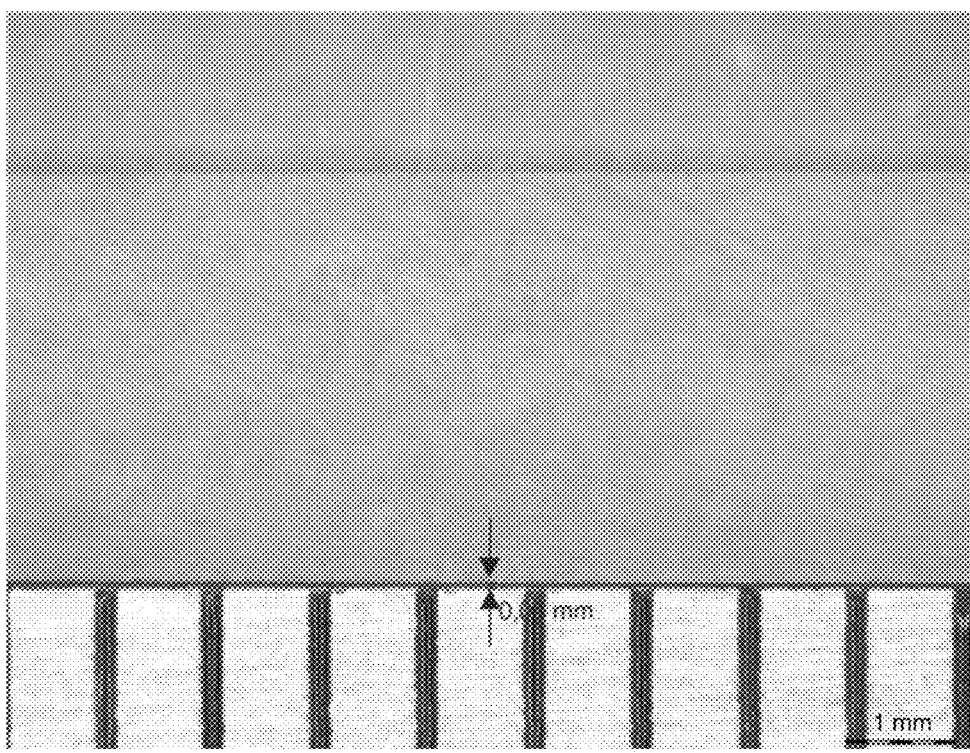

Sintering Behaviour of a Two-Layer Blank Made of Zirconia Powders With Different Yttrium Content Without Doping With La$_2$O$_3$ Example 6 was repeated identically, wherein however no dopant (lanthanum, aluminium, magnesium) was added. The results for the debound and presintered blank are shown in FIGS. 13A (overview) and 13B (detailed view). Therein, it can be clearly seen that the dentine layer (L1) has shrunk more than the cutting layer (L2), whereby the blank has obtained a convex shape. The bending of the blank was 0.74 mm. The results after the dense sintering of the blank are shown in FIGS. 14A (overview) and 14B (detailed view). According to this, even the densely sintered blank still showed a bending of 0.05 mm.

Example 6 was repeated in identical manner. However, no dopant (lanthanum, aluminium, magnesium) was added. The results for the debound and pre-sintered blank are shown in FIGS. 13A (overview) and 13B (detailed view).

Example 8

Aligning the Sintering Behaviour of a Blank With a Continuous Colour and Translucence Gradient Made of Zirconia Powders With Different Yttrium Content by Doping With La$_2$O$_3$, Al$_2$O$_3$ and MgO For the preparation of coloured zirconia powders, commercially available zirconia powders (TOSOH Zpex and TOSOH Zpex Smile) were used as raw materials and were treated with solutions of nitrate salts of colouring elements and optionally lanthanum or aluminium and magnesium as dopant according to the following table using the general process. Thereby, a powder (L1) suitable for a dentine layer and a powder (L2) suitable for a cutting layer were obtained:

| Powder | Starting powder | Colouring elements [1] | Dopant |
|---|---|---|---|
| L2 Cutting | TOSOH Zpex Smile [2] | 0.0676 wt-% Fe [4]<br>0.0003 wt.-% Mn [5]<br>0.0005 wt.-% Pr [6]<br>0.0112 wt.-% Tb [7]<br>0.2249 wt.-% Er [8] | 0.03 wt-% Al [9]<br>0.01 wt-% Mg [10] |
| L1 Dentine | TOSOH Zpex [3] | 0.0734 wt-% Fe [4]<br>0.0006 wt.-% Mn [5]<br>0.0001 wt.-% Pr [6]<br>0.0095 wt.-% Tb [7]<br>0.6647 wt.-% Er [8] | 0.62 wt-% La [11] |

[1] based on the total weight of the oxide mixture after the sintering
[2] contains 9.25 wt.-% $Y_2O_3$ and 0.048 wt.-% $Al_2O_3$
[3] contains 5.36 wt.-% $Y_2O_3$ and 0.048 wt.-% $Al_2O_3$
[4] calculated as $Fe_2O_3$
[5] calculated as $Mn_2O_3$
[6] calculated as $Pr_2O_3$
[7] calculated as $Tb_2O_3$
[8] calculated as $Er_2O_3$
[9] calculated as $Al_2O_3$
[10] calculated as MgO
[11] calculated as $La_2O_3$ Subsequently, the coloured zirconia powders were filled into the pressing die (diameter about 100 mm) of a powder press in form of a continuous gradient using a suitable filling process and densified axially at a pressure of about 160 MPa. The green body obtained in this way was debound and presintered using the following firing programme:

60 K/min to 120° C.,
24 K/min to 200° C.,
10 K/min to 320° C.,
60 K/min to 1050° C., holding time 3 h.

Figure 15:
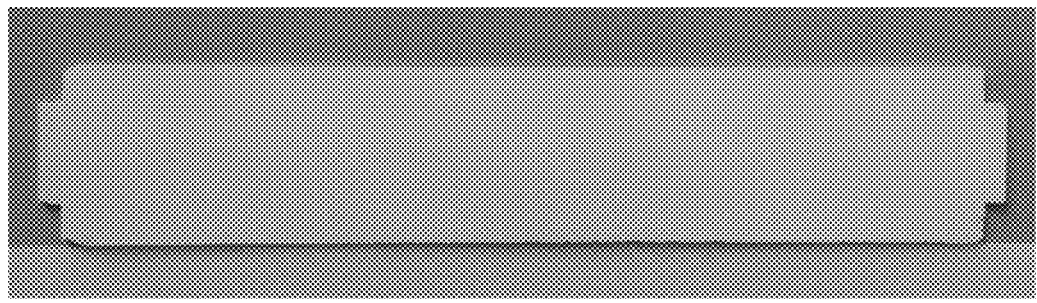
FIG. 15 shows a debound and presintered blank.

An about 2 mm thick section was sawn out of the debound and presintered blank obtained in this way using a saw (IsoMet 4000, Buehler, Esslingen). The result is shown in FIG. 15. The presintered blank showed only a negligible bending.

In addition, the development of the Vickers hardness $HV_5$ over the gradient was measured on the section of the presintered blank at 10 measuring points at a spacing in each case of 2 mm using a hardness testing machine (ZHU 0.2, Zwick Roell, Ulm). The hardness values determined are listed in the following table:

| Measuring point | $HV_5$ [MPa] |
|---|---|
| 1 | 651 |
| 2 | 670 |
| 3 | 676 |
| 4 | 673 |
| 5 | 642 |
| 6 | 600 |
| 7 | 557 |
| 8 | 543 |
| 9 | 560 |
| 10 | 554 |

From these values, a coefficient of distortion of d=0.22 was calculated.

Finally, the section of the presintered blank was densely sintered in a Programat S1 furnace (Ivoclar Vivadent AG, Schaan) using the following firing and cooling programme:

600 H/h to 900° C., holding time 0.5 h
200 K/h to 1500° C., holding time 2 h
600 K/h to 900° C.,
500 K/h to 300° C.

Figure 16:
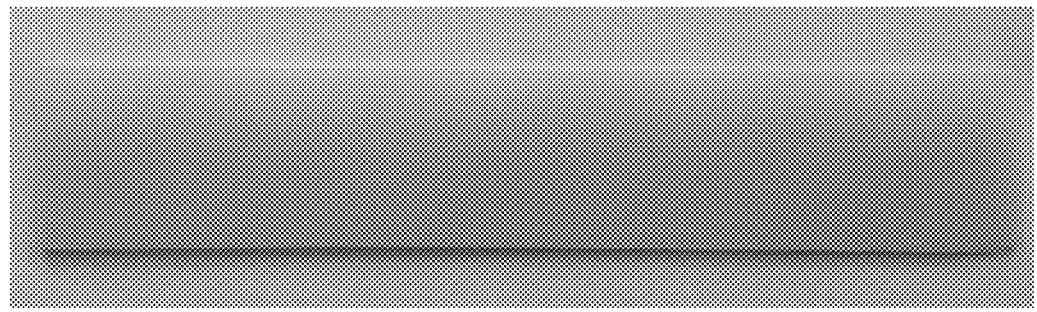
FIG. 16 shows a densely sintered blank under a stereo microscope.

The section of the densely sintered blank was again measured under the stereo microscope as described above. The result is shown in FIG. 16. The densely sintered blank showed only a negligible bending.

The invention claimed is:

1. Presintered multilayer oxide ceramic blank for the production of dental restorations, which comprises at least two different layers, wherein the oxide ceramic is based on stabilized tetragonal zirconia polycrystal, at least one layer comprises 0.005 to 1.0 wt.-% $La_2O_3$ and the at least two different layers differ in their content of $La_2O_3$, and all layers comprise 0.1 to 12.5 wt. % $Y_2O_3$.

2. Blank according to claim 1, in which at least one layer comprises 0.01 to 1.0 wt.-% $La_2O_3$.

3. Blank according to claim 1, in which at least one layer comprises $Al_2O_3$ and/or MgO.

4. Blank according to claim 3, in which at least one layer comprises $La_2O_3$ and at least one other layer comprises $Al_2O_3$ and/or MgO.

5. Blank according to claim 3, wherein the at least one layer which comprise $Al_2O_3$ and/or MgO comprises 0.001 to 5 wt.-% $Al_2O_3$ and/or MgO.

6. Blank according to claim 3, wherein the at least one layer which comprise $Al_2O_3$ and/or MgO comprises 0.001 to 5 wt.-% $Al_2O_3$.

7. Blank according to claim 3, wherein the at least one layer which comprise $Al_2O_3$ and/or MgO comprises 0.001 to 5 wt.-% MgO.

8. Blank according to claim 3, wherein the at least one layer which comprise $Al_2O_3$ and/or MgO comprises $Al_2O_3$ and MgO in a weight ratio of 10:1 to 1:10.

9. Blank according to claim 1, in which at least two different layers differ in their content of $Y_2O_3$, wherein the difference in the $Y_2O_3$ content between a layer with the lowest $Y_2O_3$ content and a layer with the highest $Y_2O_3$ content is at least 1.0 wt.-%.

10. Blank according to claim 9, in which the layer with the highest $Y_2O_3$ content comprises 0.001 to 5 wt.-% $Al_2O_3$ and/or MgO.

11. Blank according to claim 1, in which the layer with the lowest $Y_2O_3$ content comprises 0.005 to 1.0 wt.-% $La_2O_3$.

12. Blank according to claim 1, in which the proportion by weight of $La_2O_3$ in each of at least two different layers is calculated according to the following formula:

$$m(La_2O_3) = m_{min}(La_2O_3) + (m_{max}(Y_2O_3) - m(Y_2O_3)) * f,$$

wherein
  $m(La_2O_3)$ is the proportion by weight of $La_2O_3$ in the respective layer,
  $m_{min}(La_2O_3)$ is the minimum proportion by weight of $La_2O_3$ of all layers,
  $m(Y_2O_3)$ is the proportion by weight of $Y_2O_3$ in the respective layer,
  $m_{max}(Y_2O_3)$ is the maximum proportion by weight of $Y_2O_3$ of all layers, and
  f is in the range of from 0.01 to 1.00.

13. Blank according to claim 1, which is suitable for the production of a multi-unit dental restoration.

14. Blank according to claim 1, in which the at least two different layers have different colours.

15. Blank according to claim 1, which has a coefficient of distortion $$d = \frac{(HV_{max} - HV_{min})}{HV}$$

of less than 0.4, wherein the coefficient is calculated on the basis of at least one measurement of HV for each of the different layers, wherein:

HV is the Vickers hardness measured at a load in the range of from 2.5 to 5.0 kgf (24.517 to 49.034 N) in accordance with ISO 14705:2008;

$HV_{max}$ is the maximum of the measured values of HV;

$HV_{min}$ is the minimum of the measured values of HV; and $\overline{HV}$ is the arithmetic mean of the measured values of HV.

16. Blank according to claim 1, in which the sintering behaviour of the at least two different layers is aligned such that the blank can sinter without distortion.

17. Process for the production of a dental restoration, in which a blank according to claim 1 is used.

18. Process according to claim 17, in which the blank is given the shape of a desired geometry in order to obtain a shaped ceramic product, wherein the shaping is carried out by machining.

19. Process according to claim 18, in which the shaped ceramic product has the shape of a dental framework or abutment or of a monolithic fully anatomical dental restoration or a multi-unit dental restoration.

20. Process according to claim 18, in which furthermore the shaped ceramic product is densely sintered.

21. Blank according to claim 1, which comprises at least two different layers, which are formed from at least one first oxide ceramic material and one second oxide ceramic material, wherein the layers of the oxide ceramic materials exhibit a continuous change of composition from the composition of the first oxide ceramic material to the composition of the second oxide ceramic material.

22. Multilayer oxide ceramic green body for the production of dental restorations, which comprises at least two different layers, wherein the oxide ceramic is based on stabilized tetragonal zirconia polycrystal, at least one layer comprises 0.005 to 1.0 wt.-% $La_2O_3$ and the at least two different layers differ in their content of $La_2O_3$, and all layers comprise 0.1 to 12.5 wt.-% $Y_2O_3$.

23. Green body according to claim 22, wherein at least one layer comprises $Al_2O_3$ and/or MgO.

24. Process for the production of a blank according to claim 1, in which
 (a) at least one first oxide ceramic material and one second oxide ceramic material are provided which differ in terms of their chemical composition,
 (b) $La_2O_3$ is added to at least one of the oxide ceramic materials, and
 (c) optionally, $Al_2O_3$ and/or MgO is added to at least one oxide ceramic material.

25. Process according to claim 24, in which at least one oxide ceramic material is infiltrated or coated with $La_2O_3$ and/or at least one oxide ceramic material is infiltrated or coated with $Al_2O_3$ and/or MgO.

26. Process according to claim 24, in which furthermore
 (d) layers of the oxide ceramic materials are formed and the layers are arranged one on the other,
 (e) the oxide ceramic materials are compacted in order to obtain a green body, and
 (f) the green body is presintered in order to obtain a presintered ceramic blank.

27. Process according to claim 26, in which the layers of the oxide ceramic materials exhibit a continuous change of composition from a composition of the first oxide ceramic material to a composition of the second oxide ceramic material.

28. Presintered multilayer oxide ceramic blank or multilayer green body which is obtainable by a process according to claim 24.

* * * * *